US012109167B2

(12) United States Patent
Seo et al.

(10) Patent No.: US 12,109,167 B2
(45) Date of Patent: Oct. 8, 2024

(54) WEARABLE APPARATUS AND OPERATING METHOD THEREOF

(71) Applicant: Samsung Electronics Co., Ltd., Suwon-si (KR)

(72) Inventors: Keehong Seo, Suwon-si (KR); Kyungrock Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 330 days.

(21) Appl. No.: 16/855,341

(22) Filed: Apr. 22, 2020

(65) Prior Publication Data

US 2021/0121354 A1 Apr. 29, 2021

(30) Foreign Application Priority Data

Oct. 28, 2019 (KR) ........................ 10-2019-0134684

(51) Int. Cl.
*A61H 3/00* (2006.01)
*A61H 1/02* (2006.01)

(52) U.S. Cl.
CPC ............ *A61H 3/00* (2013.01); *A61H 1/0244* (2013.01); *A61H 2201/165* (2013.01); *A61H 2201/5061* (2013.01); *A61H 2201/5069* (2013.01); *A61H 2201/5079* (2013.01)

(58) Field of Classification Search
CPC .................... A61H 3/00; A61H 1/0244; A61H 2201/0165; A61H 2201/5061; A61H 2201/5069; A61H 2201/5079
See application file for complete search history.

(56) References Cited

U.S. PATENT DOCUMENTS

2008/0161937 A1* 7/2008 Sankai ............... A63B 24/0087 623/25
2015/0173929 A1* 6/2015 Kazerooni ............... A61H 1/00 602/16
2018/0280178 A1 10/2018 Shimada et al.
2019/0046078 A1* 2/2019 Lim ..................... A61H 1/0237
2019/0160321 A1* 5/2019 Ozsecen .................. A61H 3/00
2019/0283247 A1* 9/2019 Chang .................... G05B 17/02
2020/0297571 A1* 9/2020 Takahashi .............. B25J 13/088
2020/0323726 A1* 10/2020 Dalley ................... B25J 9/0006
(Continued)

FOREIGN PATENT DOCUMENTS

KR 10-2017-0019175 A 2/2017
KR 10-2017-0094306 A 8/2017
KR 10-2017-0101377 A 9/2017
(Continued)

OTHER PUBLICATIONS

Notice of Preliminary Rejection issued Apr. 22, 2024 in Korean Application No. 10-2019-0134684.

*Primary Examiner* — Jerrah Edwards
*Assistant Examiner* — Aren Patel
(74) *Attorney, Agent, or Firm* — Harness, Dickey & Pierce, P.L.C.

(57) ABSTRACT

A wearable apparatus recognizes an exercise move of a user based on motion information of the user, determines torque reference information based on a result of the recognizing, determines torque command information based on the determined torque reference information and a predetermined factor, and outputs a torque based on the determined torque command information.

18 Claims, 22 Drawing Sheets

(56) References Cited

U.S. PATENT DOCUMENTS

| | | | | |
|---|---|---|---|---|
| 2021/0022943 | A1* | 1/2021 | Tsou | B25J 13/088 |
| 2021/0369533 | A1* | 12/2021 | Huang | A61H 1/0244 |

FOREIGN PATENT DOCUMENTS

| | | | |
|---|---|---|---|
| KR | 10-2018-0059079 | A | 6/2018 |
| KR | 10-2019-0011864 | A | 2/2019 |
| KR | 10-2019-0018070 | A | 2/2019 |
| WO | 2019/060791 | A1 | 3/2019 |

* cited by examiner

FIG.15

| Step-up exercise case | State transition |
|---|---|
| Left leg step up→Right leg step up→Left leg step down→Right leg step down | s0→s1→s2→s3→s0→s4→s5→s6→s0 |
| Left leg step up→Right leg step up→Right leg step down→Left leg step down | s0→s1→s2→s3→s0→s1→s2→s3→s0 |
| Right leg step up→Left leg step up→Left leg step down→Right leg step down | s0→s4→s5→s6→s0→s4→s5→s6→s0 |
| Right leg step up→Left leg step up→Right leg step down→Left leg step down | s0→s4→s5→s6→s0→s1→s2→s3→s0 |

WEARABLE APPARATUS AND OPERATING METHOD THEREOF

CROSS-REFERENCE TO RELATED APPLICATION

This application claims priority under 35 U.S.C. § 119 to Korean Patent Application No. 10-2019-0134684, filed on Oct. 28, 2019, in the Korean Intellectual Property Office, the entire contents of which are incorporated herein by reference in their entirety.

BACKGROUND

1. Field

At least one example embodiment relates to a wearable apparatus.

2. Description of the Related Art

With the onset of rapidly aging societies, an increasing number of people may experience inconvenience and/or pain from joint problems. Thus, there may be a growing interest in walking assistance apparatuses enabling the elderly and/or patients having joint problems to walk with less effort. Further, walking assistance apparatuses increasing muscular strength of users are being developed.

SUMMARY

Some example embodiments relate to an operating method of a wearable apparatus.

In some example embodiments, the operating method includes recognizing an exercise move of a user based on motion information of the user; determining torque reference information based on the exercise move of the user; determining torque command information based on the torque reference information and a set factor; and outputting a torque based on the torque command information.

In some example embodiments, the recognizing includes recognizing the exercise move of an exercise performed by the user based on at least one of (i) angular velocities of hip joint angles of both hips of the user and (ii) at least one of the hip joint angles of the user.

In some example embodiments, the recognizing includes recognizing the exercise move of the user as stepping forward with a first leg in response to a difference between the hip joint angles of the user being greater than a first threshold angle; and recognizing the exercise move of the user stepping forward with a second leg in response to the difference between the hip joint angles of the user being less than a second threshold angle.

In some example embodiments, the recognizing includes recognizing the exercise move of the user as straightening a bent knee and raising an upper body or the exercise move of the user as bending a knee and lowering the upper body through a result of comparing a difference between the angular velocities of the hip joint angles of the user to a set value.

In some example embodiments, the recognizing includes recognizing the exercise move of the user as straightening a bent knee and raising an upper body, in response to a difference between the hip joint angles of the user being greater than a third threshold angle and one of the angular velocities of the hip joint angles being greater than a first threshold angular velocity.

In some example embodiments, the recognizing includes recognizing the exercise move of the user as bending knees and lowering an upper body through a result of comparing an average of the hip joint angles of the user to a fourth threshold angle.

In some example embodiments, the recognizing includes recognizing the exercise move of the user as straightening bent knees and raising an upper body through a result of comparing an average of angular velocities of the hip joint angles of the user to a set value.

In some example embodiments, the recognizing includes recognizing the exercise move of the user as straightening bent knees and raising an upper body in response to an average of the hip joint angles of the user being less than a fifth threshold angle and an average of angular velocities of the hip joint angles being greater than a second threshold angular velocity.

In some example embodiments, the recognizing includes recognizing the exercise move of the user as stepping up with one leg in response to one of the hip joint angles of the user being less than a sixth threshold angle and an angular velocity of the one of the hip joint angles being less than a third threshold angular velocity.

In some example embodiments, the recognizing includes sensing whether one of hip joint angles of the user is less than a seventh threshold angle and whether an angular velocity of the one of the hip joint angles is greater than a fourth threshold angular velocity, in response to recognition of the exercise move of the user being stepping up with one leg; and recognizing the exercise move of the user as stepping on an object with the one leg based on a result of the sensing.

In some example embodiments, the recognizing includes sensing whether one of hip joint angles of the user is greater than an eighth threshold angle, whether an angular velocity of the one of the hip joint angles is greater than a fifth threshold angular velocity, and whether an acceleration measured with respect to a body of the user is less than a threshold acceleration, in response to recognition of the exercise move of the user being stepping on an object with a first leg; and recognizing the exercise move of the user as stepping up with a second leg while stepping on the object with the first leg based on a result of the sensing.

In some example embodiments, the recognizing includes sensing whether one of hip joint angles of the user is greater than a ninth threshold angle and whether an angular velocity of the one of the hip joint angles is less than a sixth threshold angular velocity, in response to recognition of the exercise move of the user as stepping up with a first leg while stepping on an object with a second leg; and recognizing the exercise move of the user as stepping on the object with both of the first leg and the second leg based on a result of the sensing.

In some example embodiments, the recognizing includes sensing whether one of hip joint angles of the user is less than a tenth threshold angle and whether an angular velocity of the one of the hip joint angles is less than a seventh threshold angular velocity, in response to recognition of the exercise move of the user as stepping on an object with both a first leg and a second leg of the user; and recognizing the exercise move of the user as stepping down with the first leg from the object based on a result of the sensing.

In some example embodiments, the recognizing includes sensing whether one of hip joint angles of the user is less than an eleventh threshold angle and whether an angular velocity of the one of the hip joint angles is greater than an eighth threshold angular velocity, in response to recognition of the exercise move of the user as stepping down with a first leg from an object while stepping on the object with a second leg; and recognizing the exercise move of the user as stepping on a ground with the first leg and stepping on the object with the second leg based on a result of the sensing.

In some example embodiments, the recognizing includes sensing whether one of hip joint angles of the user is greater than a twelfth threshold angle, whether an angular velocity of the one of the hip joint angles is greater than a ninth threshold angular velocity, and whether an acceleration measured with respect to a body of the user is less than a threshold acceleration, in response to recognition of the exercise move of the user as stepping on a ground with a first leg and stepping on an object with a second leg; and recognizing the exercise move of the user as stepping down with the second leg based on a result of the sensing.

In some example embodiments, the recognizing includes sensing whether one of hip joint angles of the user is greater than a thirteenth threshold angle and whether an angular velocity of the one of the hip joint angles is less than a tenth threshold angular velocity, in response to recognition of the exercise move of the user as stepping down with a first leg from an object while stepping on a ground with a second leg; and recognizing the exercise move of the user as stepping on the ground with both the first leg and the second leg based on a result of the sensing.

In some example embodiments, the determining of the torque reference information includes determining the torque reference information based on a torque gain and at least one of a constant and a difference between hip joint angles of the user.

In some example embodiments, the determining of the torque command information includes determining the torque command information by smoothing the torque reference information based on the set factor.

Some example embodiments relate to a wearable apparatus.

In some example embodiments, the wearable apparatus comprises a driver configured to output a torque; and a controller configured to, recognize an exercise move of a user based on motion information of the user, determine torque reference information based on the exercise move of the user, determine torque command information based on the torque reference information and a set factor, and control the driver to output the torque based on the torque command information.

In some example embodiments, the controller is configured to recognize the exercise move of an exercise performed by the user based on at least one of (i) angular velocities of hip joint angles of both hips of the user and (ii) at least one of the hip joint angles of the user.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 12A through 15 illustrate a step-up exercise assistance of a wearable apparatus according to at least one example embodiment;

DETAILED DESCRIPTION

Figure 1:
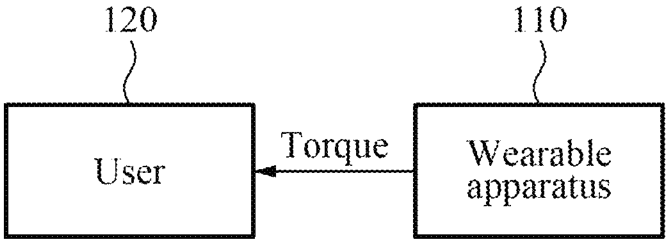
FIGS. 1 through 3 illustrate a wearable apparatus according to at least one example embodiment.

Hereinafter, examples will be described in detail with reference to the accompanying drawings.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Figure 2:
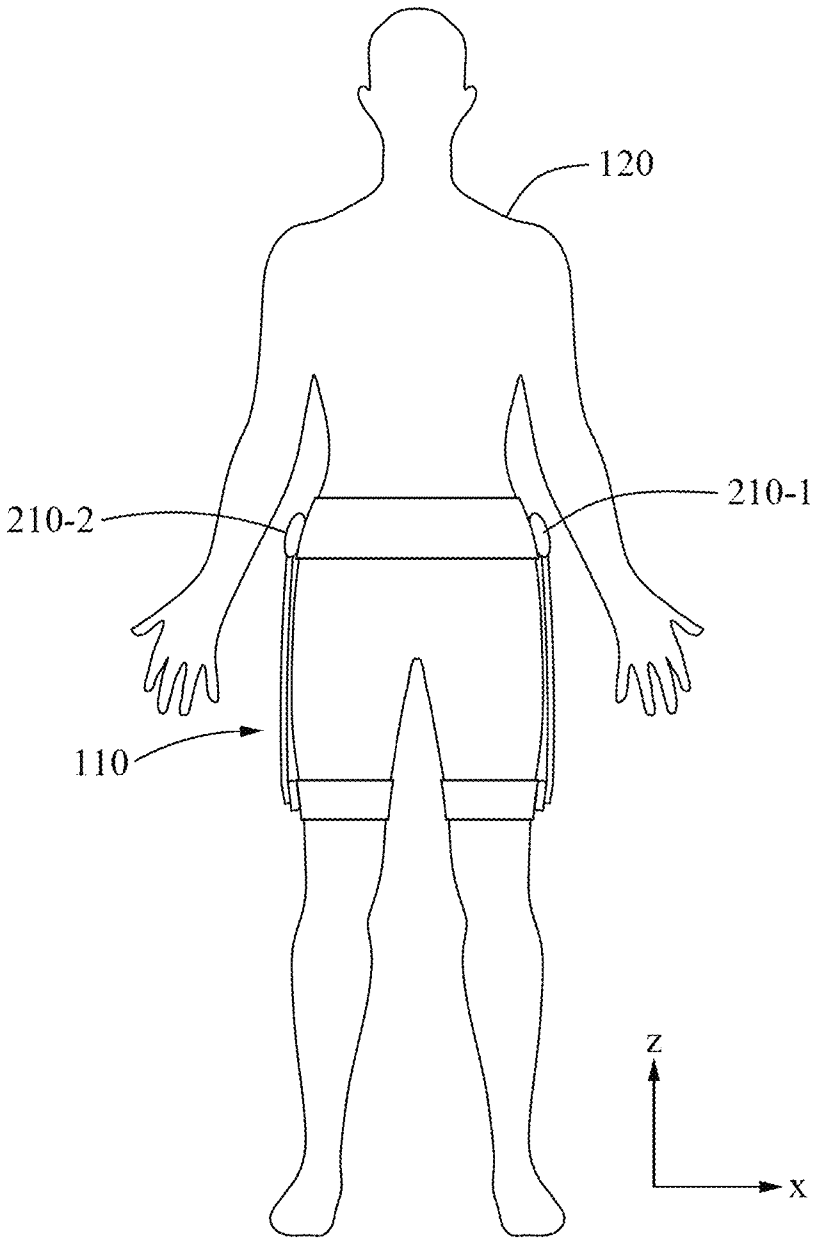
Figure 3:
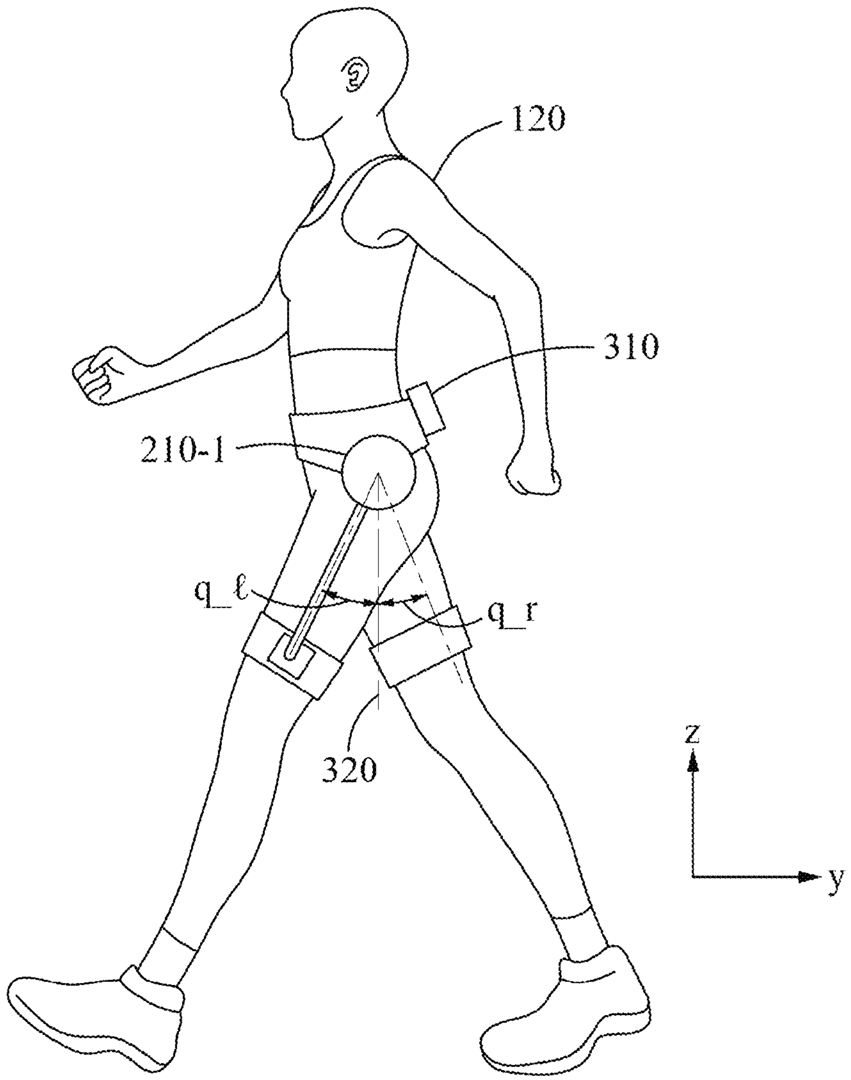

FIGS. 1 through 3 illustrate a wearable apparatus according to at least one example embodiment.

Referring to FIG. 1, a wearable apparatus 110 may output a torque. In detail, the wearable apparatus 110 may recognize an exercise move of a user 120 based on motion information (for example, both hip joint angles) of the user 120, determine torque reference information based on a result of the recognizing, determine torque command information based on the determined torque reference information and a desired (or, alternatively, a predetermined) factor, and output the torque based on the determined torque command information.

The torque output by the wearable apparatus 110 may be used to assist an exercise of the user 120. That is, the wearable apparatus 110 may output an assistance torque to assist the exercise of the user 120. Depending on implementation, the wearable apparatus 110 may apply a resistance to the exercise of the user 120. That is, the wearable apparatus 110 may output a resistance torque to apply a resistance to the exercise of the user 120.

The exercise may include, for example, a lower-limb exercise, but is not limited thereto.

The wearable apparatus 110 may be a hip-type wearable apparatus to be worn on hip joints or thighs of the user 120, an ankle-type wearable apparatus to be worn on ankles of the user 120, or a knee-type wearable apparatus to be worn on knees of the user 120, but is not limited thereto. FIGS. 2 and 3 show an example of the hip-type wearable apparatus 110.

Referring to FIGS. 2 and 3, drivers 210-1 and 210-2 of the wearable apparatus 110 may be positioned around the hip joints of the user 120, and a controller 310 of the wearable apparatus 110 may be positioned around a waist of the user 120. That is, the hip-type wearable apparatus 110 may be designed such that the drivers 210-1 and 210-2 are positioned around the hip joints of the user 120 and the controller 310 is positioned around the waist of the user 120. However, the positions of the drivers 210-1 and 210-2 and the controller 310 are not limited to those shown in FIGS. 2 and 3.

The wearable apparatus 110 may measure or sense a left hip joint angle and/or a right hip joint angle of the user 120. For example, the wearable apparatus 110 may measure or sense a left hip joint angle q_l of the user 120 through a left encoder and measure and/or sense a right hip joint angle q_r of the user 120 through a right encoder. In the example of FIG. 3, the left hip joint angle q_l of a left leg positioned ahead of a reference line 320 may be a negative number, and the right hip joint angle q_r of a right leg positioned behind the reference line 320 may be a positive number. Depending on implementation, the right hip joint angle q_r may be a negative number when the right leg is positioned ahead of the reference line 320, and the left hip joint angle q_l may be a positive number when the left leg is positioned behind the reference line 320.

FIGS. 4A through 7 illustrate a lunge exercise assistance of a wearable apparatus according to at least one example embodiment.

FIGS. 4A through 4G illustrate exercise moves of a lunge exercise.

Figure 4A:
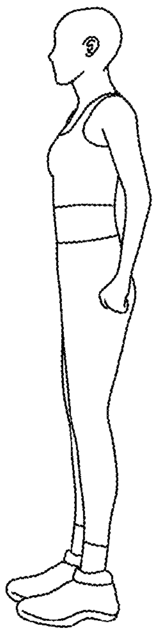
FIGS. 4A through 7 illustrate a lunge exercise assistance of a wearable apparatus according to at least one example embodiment.
Figure 4B:
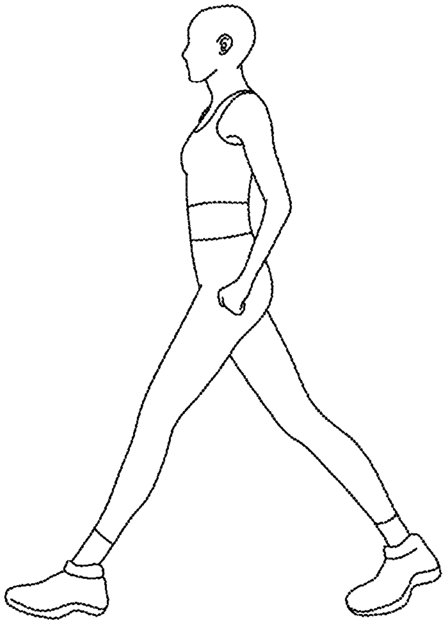

FIG. 4A shows an exercise move of the user 120 standing, and FIG. 4B shows an exercise move of the user 120 with a left leg positioned forward and a right leg positioned behind.

Figure 4C:
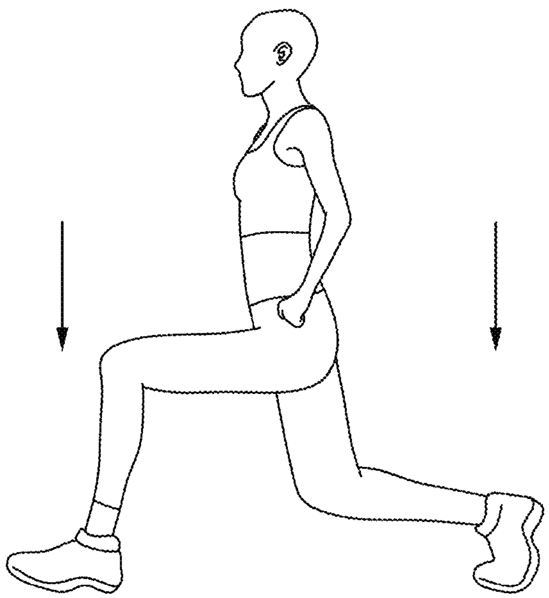

FIG. 4C shows an exercise move of bending a left knee and lowering a right knee and an upper body. That is, FIG. 4C shows a going-down exercise move (or a sitting-down exercise move) of the lunge exercise when the left leg is positioned forward.

Figure 4D:
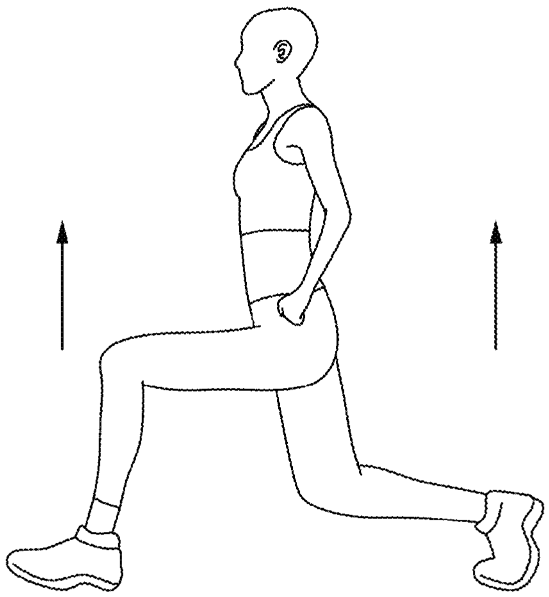

FIG. 4D shows an exercise move of straightening the bent left knee and raising the lowered right knee and upper body. That is, FIG. 4D shows a going-up exercise move (or a standing-up exercise move) of the lunge exercise when the left leg is positioned forward.

Figure 4E:
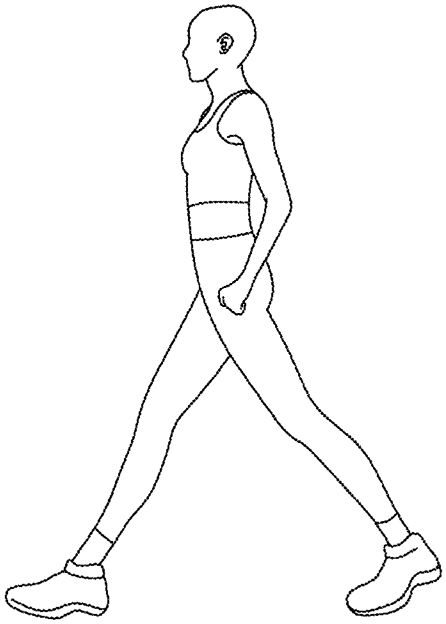

FIG. 4E shows an exercise move of the user 120 with the right leg positioned forward and the left leg positioned behind.

Figure 4F:
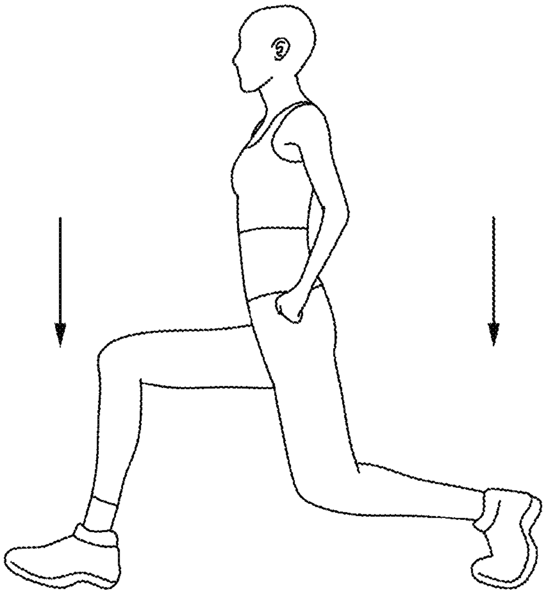

FIG. 4F shows an exercise move of bending the right knee and lowering the left knee and the upper body. That is, FIG. 4F shows a going-down exercise move of the lunge exercise when the right leg is positioned forward.

FIG. 4E shows an exercise move of straightening the bent right knee and raising the lowered left knee and upper body. That is, FIG. 4E shows a going-up exercise move of the lunge exercise when the right leg is positioned forward.

The wearable apparatus 110 may recognize the exercise moves of the lunge exercise. For example, the wearable apparatus 110 may be set in a lunge exercise mode, among several exercise modes, and recognize the exercise moves of the lunge exercise through a rule-based manner or a finite state machine (FSM)-based manner while the user 120 is performing the lunge exercise. The rule-based manner will be described further with reference to FIG. 5, and the FSM-based manner will be described further with reference to FIG. 6.

Figure 5:
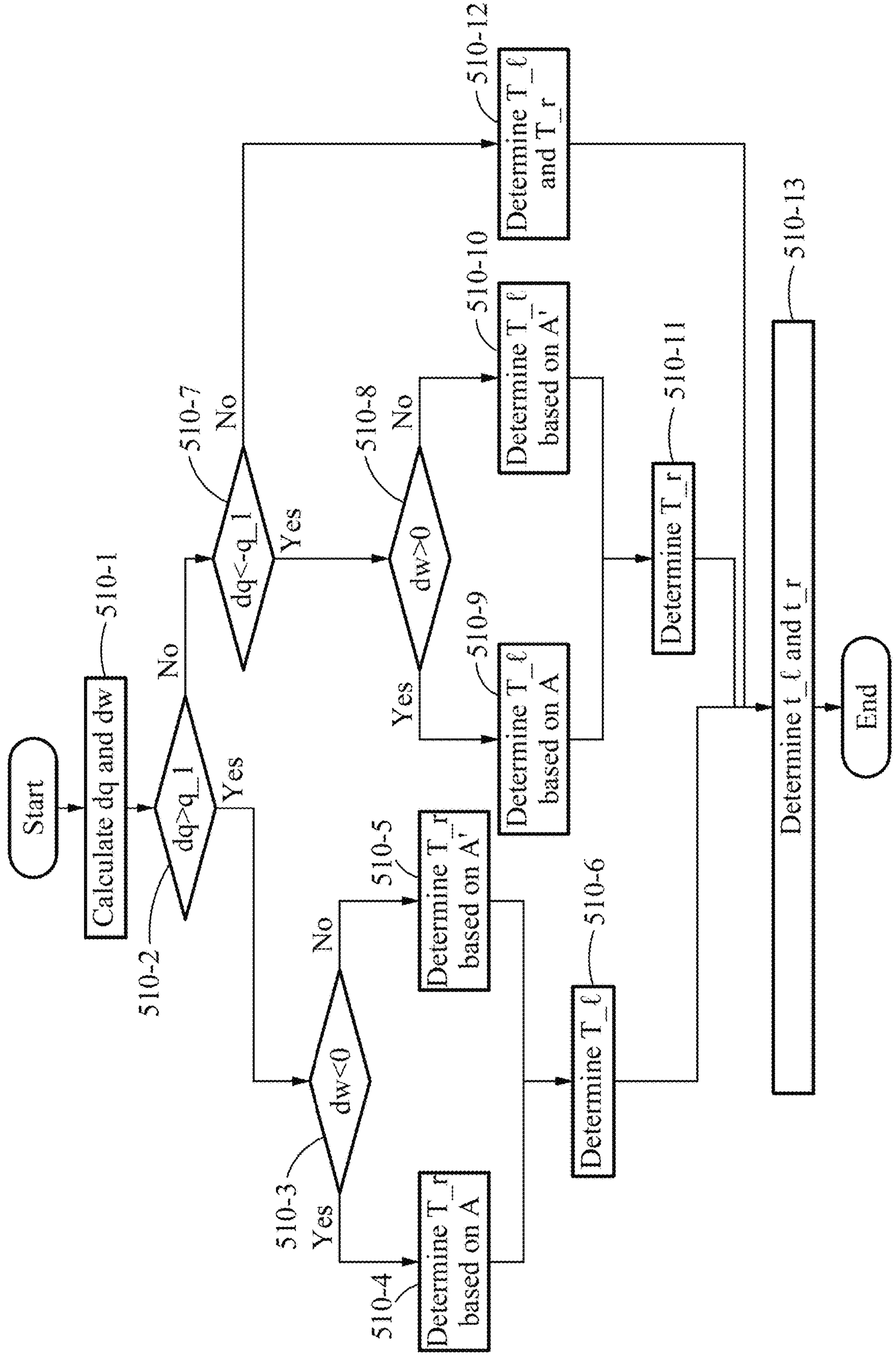

Referring to FIG. 5, in operation 510-1, the wearable apparatus 110 may calculate a difference dq between both hip joint angles and a difference dw between angular velocities of the hip joint angles. For example, the wearable apparatus 110 may calculate the difference dq between the hip joint angles based on Equation 1, and calculate the difference dw between the angular velocities of the hip joint angles based on Equation 2.

$$q=q\_l-q\_r \quad \text{[Equation 1]}$$

$$dw=w\_l-w\_r \quad \text{[Equation 2]}$$

In Equation 1, q_l denotes the left hip joint angle, and q_r denotes the right hip joint angle. In Equation 2, w_l denotes the angular velocity of the left hip joint angle, and w_r denotes the angular velocity of the right hip joint angle.

In operation 510-2, the wearable apparatus 110 may determine whether the difference dq between the hip joint angles is greater than q_l. q_l may be, for example, 30 degrees, but is not limited thereto.

In response to the difference dq between the hip joint angles being greater than q_l, the wearable apparatus 110 may recognize an exercise move of the user 120 with the right leg positioned forward (for example, the exercise move of FIG. 4E).

In response to the difference dq between the hip joint angles being greater than q_l, the wearable apparatus 110 may determine whether the difference dw between the angular velocities of the hip joint angles is less than “0”, in operation 510-3.

In response to the difference dw between the angular velocities of the hip joint angles being greater than or equal to “0”, the wearable apparatus 110 may recognize an exercise move of the user 120 bending the right knee and lowering the left knee (for example, the exercise move of FIG. 4F). In operation 510-5, the wearable apparatus 110 may determine right hip joint torque reference information T_r based on a gain A'. For example, the wearable apparatus 110 may determine the right hip joint torque reference information T_r based on T_r=sin(−dq)×A'. If the gain A' is a positive number, the wearable apparatus 110 may output an assistance torque. If the gain A' is a negative number, the wearable apparatus 110 may output a resistance torque. Depending on implementation, the wearable apparatus 110 may use a constant instead of −sin(−dq) in −sin(−dq)×A'.

Figure 4G:
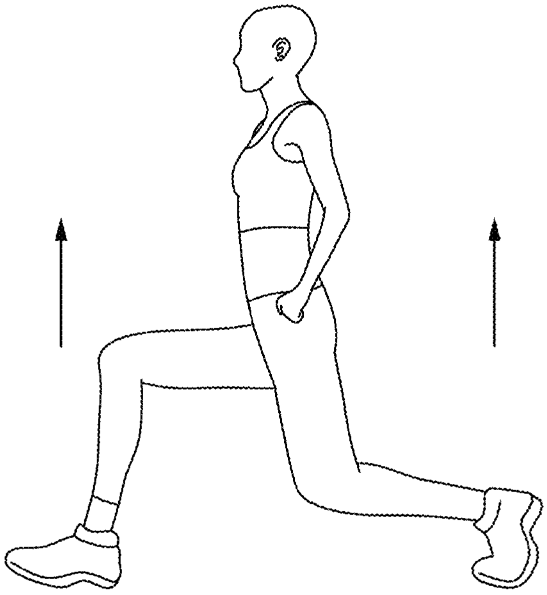

In response to the difference dw between the angular velocities of the hip joint angles being less than “0”, the wearable apparatus 110 may recognize an exercise move of the user 120 straightening the bent right knee and raising the lowered left knee and upper body (for example, the exercise move of FIG. 4G). Further, in operation 510-4, the wearable apparatus 110 may determine right hip joint torque reference information T_r based on a gain A. For example, the wearable apparatus 110 may determine the right hip joint torque reference information T_r based on T_r=−sin(−dq)×A. If the gain A in −sin(−dq)×A is a positive number (for example, if A=12 Nm), the wearable apparatus 110 may output an assistance torque. If the gain A is a negative number, the wearable apparatus 110 may output a resistance torque. Depending on implementation, the wearable apparatus 110 may use a constant instead of −sin(−dq) in −sin(−dq)×A.

In an example, the gain A may be greater than the gain A'.

In response to the determination of the right hip joint torque reference information T_r, the wearable apparatus 110 may determine left hip joint torque reference information T 1 based on the right hip joint torque reference information T_r, in operation 510-6. For example, the wearable apparatus 110 may determine the left hip joint torque reference information T 1 based on T_l=M×T_r. In M×T_r, M denotes a ratio of a torque for the other leg positioned behind to a torque for a leg positioned forward. Since the right leg is positioned forward and the left leg is positioned behind, M in operation 510-6 may denote a ratio of the left hip joint torque reference information T 1 to the right hip joint torque reference information T_r.

Referring back to operation 510-2, an example in which the difference dq between the hip joint angles is less than q_l will be described.

In response to the difference dq between the hip joint angles being less than q_l, the wearable apparatus 110 may determine whether the difference dq between the hip joint angles is less than −q_l, in operation 510-7. In response to the difference dq between the hip joint angles being less than −q_l, the wearable apparatus 110 may recognize an exercise move of the user 120 with the left leg positioned forward (for example, the exercise move of FIG. 4B).

In response to the difference dq between the hip joint angles being less than −q_l, the wearable apparatus 110 may determine whether the difference dw between the angular velocities of the hip joint angles is greater than “0”, in operation 510-8.

In response to the difference dw between the angular velocities of the hip joint angles being less than “0”, the wearable apparatus 110 may recognize an exercise move of the user 120 bending the left knee and lowering the right knee (for example, the exercise move of FIG. 4C). Further, the wearable apparatus 110 may determine left hip joint torque reference information T 1 based on a gain A', in operation 510-10. For example, the wearable apparatus 110 may determine the left hip joint torque reference information T 1 based on T_l=−sin(dq)×A'.

In response to the difference dw between the angular velocities of the hip joint angles being greater than “0”, the wearable apparatus 110 may recognize an exercise move of the user 120 straightening the bent left knee and raising the lowered right knee and upper body (for example, the exercise move of FIG. 4D). Further, the wearable apparatus 110 may determine left hip joint torque reference information T_l based on a gain A, in operation 510-9. For example, the wearable apparatus 110 may determine the left hip joint torque reference information T_l based on T_l=−sin(dq)×A.

In response to the determination of the left hip joint torque reference information T_l, the wearable apparatus 110 may determine right hip joint torque reference information T_r based on the left hip joint torque reference information T_l, in operation 510-11. For example, the wearable apparatus 110 may determine the right hip joint torque reference information T_r based on T_r=M×T_l. As described above, M denotes the ratio of the torque for the leg positioned behind to the torque for the leg positioned forward. Since the left leg is positioned forward and the right leg is positioned behind in operation 510-11, M may denote a ratio of the right hip joint torque reference information T_r to the left hip joint torque reference information T_l.

Referring back to operation 510-7, an example in which the difference dq between the hip joint angles is greater than −q_l will be described.

In response to the difference dq between the hip joint angles being greater than −q_l, the wearable apparatus 110 may determine that the user 120 is standing. That is, the wearable apparatus 110 may determine that the user 120 is performing the exercise move of FIG. 4A. In operation 510-12, the wearable apparatus 110 may determine right hip joint torque reference information T_r and left hip joint torque reference information T_l. For example, the wearable apparatus 110 may determine the right hip joint torque reference information T_r and the left hip joint torque reference information T_l respectively to be “0”.

In response to the determination of the right hip joint torque reference information T_r and the left hip joint torque reference information T_l, the wearable apparatus 110 may determine right hip joint torque command information t_r and left hip joint torque command information t_l, in operation 510-13. For example, the wearable apparatus 110 may determine the left hip joint torque command information t_l by smoothing the left hip joint torque reference information T_l, and determine the right hip joint torque command information t_r by smoothing the right hip joint torque reference information T_r. Consequently, the left hip joint torque command information t_l and the right hip joint torque command information t_r may have smooth waveforms. Equation 3 shows examples of the right hip joint torque command information t_r and the left hip joint torque command information t_l.

$$t\_l \leftarrow t\_l + r \times (T\_l - t\_l)$$

$$t\_r \leftarrow t\_r + r \times (T\_r - t\_r) \quad \text{[Equation 3]}$$

In Equation 3, r denotes a ratio for reflecting torque reference information in torque command information at each sampling time. r will be also referred to as a smoothing factor. r may be greater than “0” and less than or equal to “1”.

Referring to Equation 3, existing t_l may be updated to follow a new input T_l, and t_r may be updated to follow a new input T_r. In this example, as r decreases (in other words, r gets closer to “0”), t_l may less or slowly follow T_l, and thus stronger smoothing may be applied thereto. Similarly, t_r may less or slowly follow T_r, and thus stronger smoothing may be applied thereto. Conversely, as r increases (in other words, r gets closer to “1”), weaker smoothing may be applied.

Equation 3 may be expressed differently, as shown in Equation 4 or Equation 5.

$$t\_l = t\_l\_prv + r \times (T\_l - t\_l\_prv)$$

$$t\_r = t\_r\_prv + r \times (T\_r - t\_r\_prv) \quad \text{[Equation 4]}$$

$$t\_l(i) = t\_l(i-1) + r \times (T\_l(i) - t\_l(i-1))$$

$$t\_r(i) = t\_r(i-1) + r \times (T\_r(i) - t\_r(i-1)) \quad \text{[Equation 5]}$$

In Equation 4, t_l_prv denotes previous left hip joint torque command information, and t_r_prv denotes previous right hip joint torque command information. In Equation 5, i denotes an index of a sampling time.

As described above, the wearable apparatus 110 may also recognize the exercise moves of the lunge exercise through the FSM-based manner, which will be described below with reference to FIG. 6.

Figure 6:
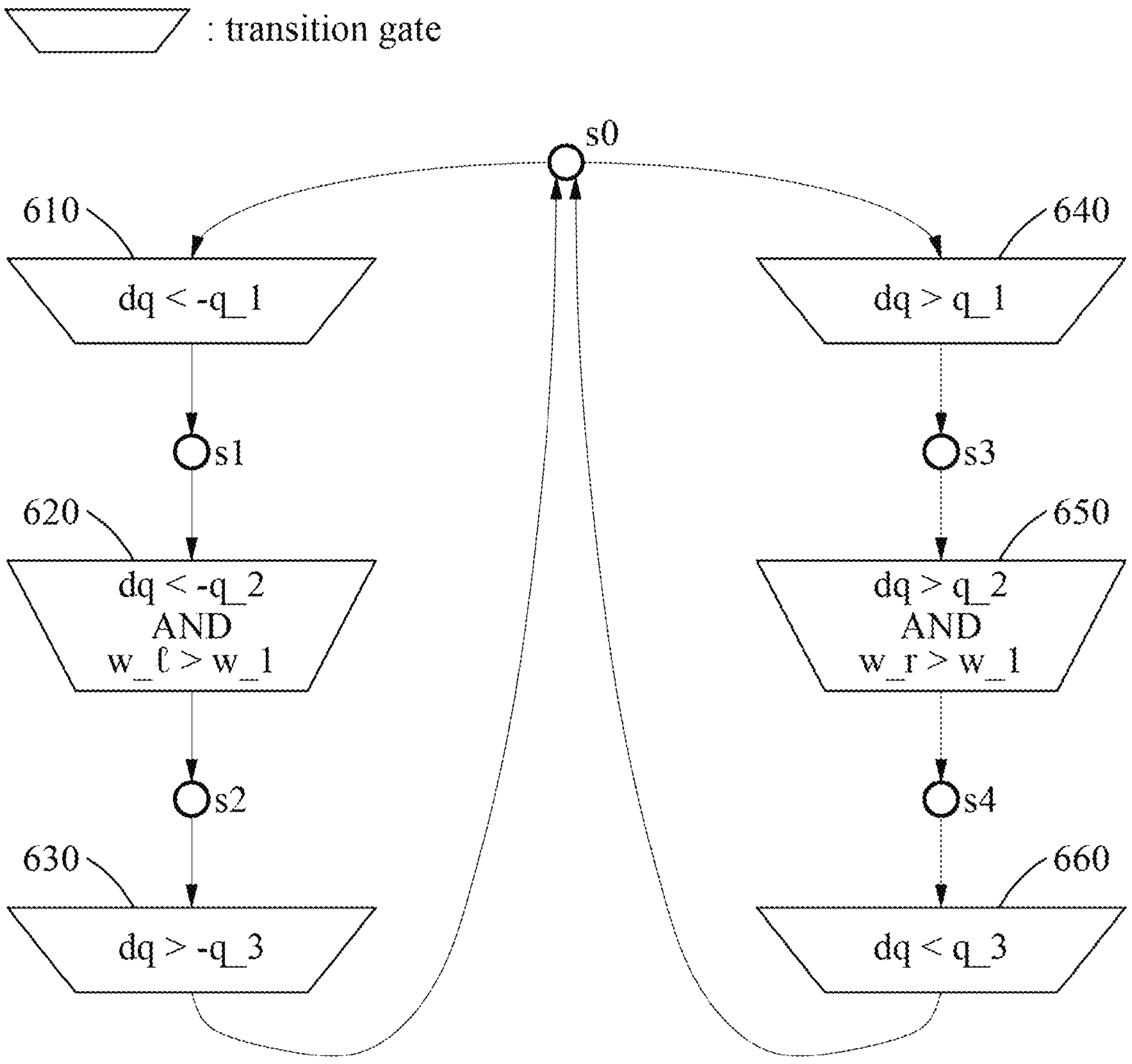

Referring to FIG. 6, a plurality of states s0 through s4 and a plurality of transition gates 610 through 666 are shown.

The state s0 may correspond to the standing exercise move of the lunge exercise as in FIG. 4A, the state s1 may correspond to the exercise move with the left leg positioned forward as in FIG. 4B, and the state s2 may correspond to the going-up exercise move of the lunge exercise when the left leg is positioned forward, as in FIG. 4D. The state s3 may correspond to the exercise move with the right leg positioned forward as in FIG. 4E, and the state s4 may correspond to the going-up exercise move of the lunge exercise when the right leg is positioned forward, as in FIG. 4G.

The transition gates 610 through 660 may each transition from a current state to a subsequent state if conditions are satisfied, and stay in the current state if the conditions are not satisfied.

Figure 7:
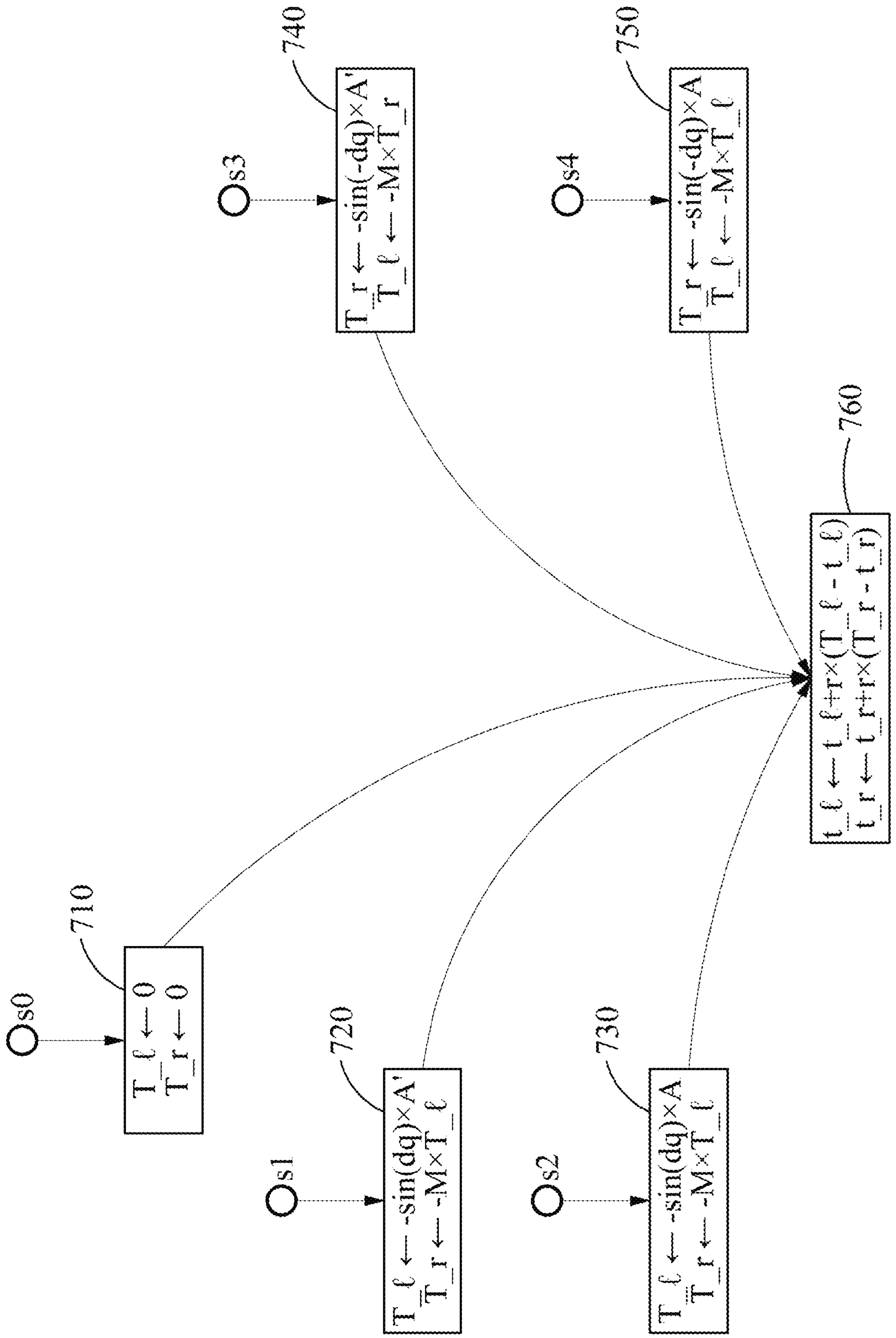

In the state s0, the wearable apparatus 110 may determine both hip joint torque reference information and determine both hip joint torque command information based on the both hip joint torque reference information. Referring to FIG. 7, in operation 710, the wearable apparatus 110 may determine left hip joint torque reference information T_l and right hip joint torque reference information T_r respectively to be "0" in the state s0. In operation 760, the wearable apparatus 110 may determine left hip joint torque command information t_l by smoothing the left hip joint torque reference information T_l and determine right hip joint torque command information t_r by smoothing the right hip joint torque reference information T_r.

In the state s0, the wearable apparatus 110 may determine whether a difference dq between both hip joint angles is less than −q_l. In response to the difference dq between the hip joint angles being less than −q_l, the wearable apparatus 110 may transition from the state s0 to the state s1.

In the state s1, the wearable apparatus 110 may determine both hip joint torque reference information and determine both hip joint torque command information based on the both hip joint torque reference information. Referring to FIG. 7, in operation 720, the wearable apparatus 110 may determine left hip joint torque reference information T_l based on T_l=−sin(dq)×A' and determine right hip joint torque reference information T_r based on T_r=M×T_l in the state s1. In operation 760, the wearable apparatus 110 may determine left hip joint torque command information t_l by smoothing the left hip joint torque reference information T_l and determine right hip joint torque command information t_r by smoothing the right hip joint torque reference information T_r. The wearable apparatus 110 may output a torque based on the determined both hip joint torque command information.

In the state s1, the wearable apparatus 110 may determine whether a difference dq between both hip joint angles is less than −q_2 and whether an angular velocity w_l of the left hip joint angle is greater than a threshold angular velocity w_1. q_2 may be, for example, 60 degrees, but is not limited thereto. The threshold angular velocity w_1 may be, for example, 0.1 rad/s, but is not limited thereto. In response to the difference dq between the hip joint angles being less than −q_2 and in response to the angular velocity w_l of the left hip joint angle being greater than threshold angular velocity w_1, the wearable apparatus 110 may transition from the state s1 to the state s2.

In the state s2, the wearable apparatus 110 may determine both hip joint torque reference information and determine both hip joint torque command information based on the both hip joint torque reference information. Referring to FIG. 7, in operation 730, the wearable apparatus 110 may determine left hip joint torque reference information T_l based on T_l=−sin(dq)×A and determine right hip joint torque reference information T_r based on T_r=M×T_l in the state s2. In operation 760, the wearable apparatus 110 may determine left hip joint torque command information t_l by smoothing the left hip joint torque reference information T_l and determine right hip joint torque command information t_r by smoothing the right hip joint torque reference information T_r. The wearable apparatus 110 may output a torque based on the determined both hip joint torque command information.

In the state s2, the wearable apparatus 110 may determine whether a difference dq between both hip joint angles is greater than −q_3. q_3 may be, for example, 15 degrees, but is not limited thereto. In response to the difference dq between the hip joint angles being greater than −q_3, the wearable apparatus 110 may transition from the state s2 to the state s0.

In the state s0, the wearable apparatus 110 may determine whether the difference dq between the hip joint angles is greater than q_1. In response to the difference dq between the hip joint angles being greater than q_1, the wearable apparatus 110 may transition from the state s0 to the state s3.

In the state s3, the wearable apparatus 110 may determine both hip joint torque reference information and determine both hip joint torque command information based on the both hip joint torque reference information. Referring to FIG. 7, in operation 740, the wearable apparatus 110 may determine right hip joint torque reference information T_r based on T_r=−sin(−dq)×A' and determine left hip joint torque reference information T_l based on T_l=M×T_r in the state s3. In operation 730, the wearable apparatus 110 may determine left hip joint torque command information t_l by smoothing the left hip joint torque reference information T_l and determine right hip joint torque command information t_r by smoothing the right hip joint torque reference information T_r. The wearable apparatus 110 may output a torque based on the determined both hip joint torque command information.

In the state s3, the wearable apparatus 110 may determine whether a difference dq between both hip joint angles is greater than q_2 and whether an angular velocity w_r of the right hip joint angle is greater than a threshold angular velocity w_1. In response to the difference dq between the hip joint angles being greater than q_2 and in response to the angular velocity w_r of the right hip joint angle being greater than the threshold angular velocity w_1, the wearable apparatus 110 may transition from the state s3 to the state s4.

In the state s4, the wearable apparatus 110 may determine both hip joint torque reference information and determine both hip joint torque command information based on the both hip joint torque reference information. Referring to FIG. 7, in operation 750, the wearable apparatus 110 may determine right hip joint torque reference information T_r based on T_r=−sin(−dq)×A and determine left hip joint torque reference information T_l based on T_l=M×T_r in the state s3. In operation 760, the wearable apparatus 110 may determine left hip joint torque command information t_l by smoothing the left hip joint torque reference information T_l and determine right hip joint torque command information t_r by smoothing the right hip joint torque reference information T_r. The wearable apparatus 110 may output a torque based on the determined both hip joint torque command information.

In the state s4, the wearable apparatus 110 may determine whether a difference dq between both hip joint angles is less than q_3. In response to the difference dq between the hip joint angles being less than q_3, the wearable apparatus 110 may transition from the state s4 to the state s0.

The wearable apparatus 110 may output a torque appropriate for each state or each exercise move. Accordingly, the wearable apparatus 110 may assist the lunge exercise of the user 120 or apply a resistance to the lunge exercise.

FIGS. 8A through 11 illustrate a squat exercise assistance of a wearable apparatus according to at least one example embodiment.

Figure 8A:
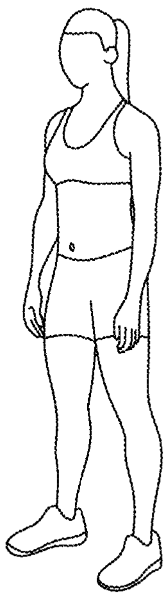
FIGS. 8A through 11 illustrate a squat exercise assistance of a wearable apparatus according to at least one example embodiment.
Figure 8B:
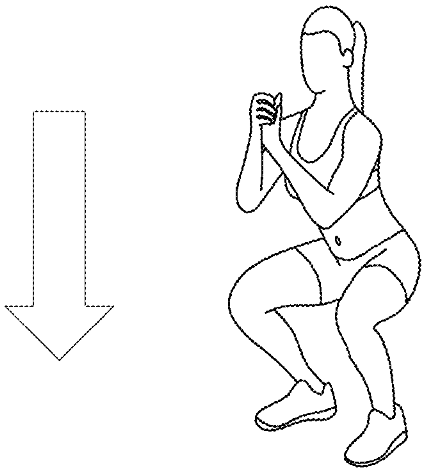
Figure 8C:
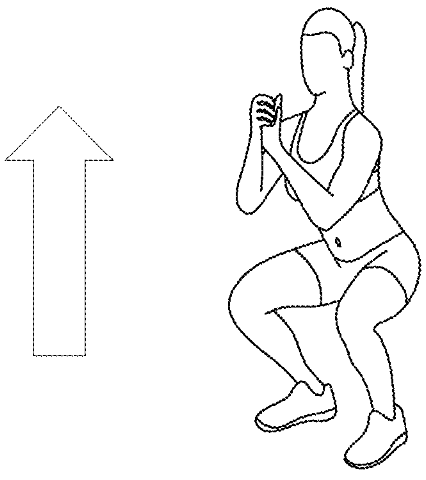

FIGS. 8A through 8C illustrate exercise moves of a squat exercise.

FIG. 8A shows an exercise move of the user 120 standing, and FIG. 8B shows an exercise move of the user 120 bending both knees and lowering an upper body. That is, FIG. 8B shows a going-down exercise move (or a sitting-down exercise move) of the squat exercise. FIG. 8C shows an exercise move of straightening the bent knees and raising the upper body. That is, FIG. 8C shows a going-up exercise move (or a standing-up exercise move) of the squat exercise.

The wearable apparatus 110 may recognize the exercise moves of the squat exercise. For example, the wearable apparatus 110 may be set in a squat exercise move, and recognize the exercise moves of the squat exercise through the rule-based manner or the FSM-based manner while the user 120 is performing the squat exercise. The rule-based manner will be described further with reference to FIG. 9, and the FSM-based manner will be described further with reference to FIG. 10.

Figure 9:
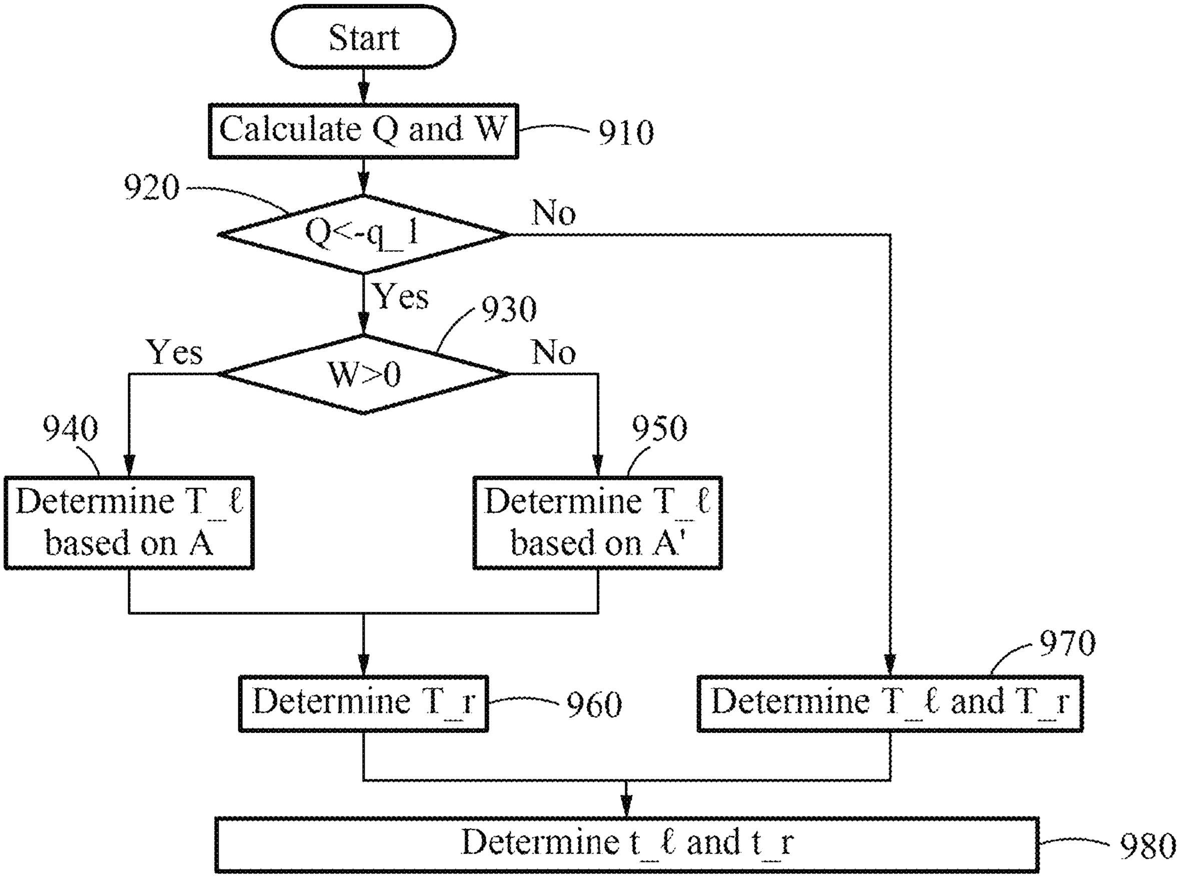

Referring to FIG. 9, in operation 910, the wearable apparatus 110 may calculate an average Q of both hip joint angles and an average W of angular velocities of the hip joint angles.

In operation 920, the wearable apparatus 110 may determine whether the average Q of the hip joint angles is less than −q_1. In response to the average Q of the hip joint angles being less than −q_1, the wearable apparatus 110 may determine that a sitting-down exercise move of a squat exercise starts.

In response to the average Q of the hip joint angles being less than −q_l, the wearable apparatus 110 may determine whether the average W of the angular velocities of the hip joint angles is greater than "0", in operation 930.

In response to the average W of the angular velocities of the hip joint angles being less than "0", the wearable apparatus 110 may recognize an exercise move of the user 120 bending both knees (for example, the exercise move of FIG. 8B). In operation 950, the wearable apparatus 110 may determine left torque reference information T_l based on a gain A'. For example, in response to the average W of the angular velocities of the hip joint angles being less than 0, the wearable apparatus 110 may determine the left torque reference information T_l based on T_l=−sin(Q)×A'. Depending on implementation, the wearable apparatus 110 may use a constant instead of −sin(Q) in −sin(Q)×A'.

In response to the average W of the angular velocities of the hip joint angles being greater than "0", the wearable apparatus 110 may recognize an exercise move of straightening the bent knees (for example, the exercise move of FIG. 8C). In operation 940, the wearable apparatus 110 may determine left torque reference information T_l based on a gain A. For example, in response to the average W of the angular velocities of the hip joint angles being greater than "0", the wearable apparatus 110 may determine the left torque reference information T_l based on T_l=−sin(Q)×A. Depending on implementation, the wearable apparatus 110 may use a constant instead of −sin(Q) in −sin(Q)×A.

In response to the determination of the left hip joint torque reference information T_l, the wearable apparatus 110 may determine right hip joint torque reference information T_r based on the left hip joint torque reference information T_l, in operation 960. For example, the wearable apparatus 110 may determine the right hip joint torque reference information T_r to be identical to the left hip joint torque reference information T_l.

Referring back to operation 920, an example in which the average Q of the hip joint angles is greater than −q_1 will be described.

In response to the average Q of the hip joint angles being greater than −q_1, the wearable apparatus 110 may determine that the user 120 is standing. That is, the wearable apparatus 110 may recognize the exercise move of FIG. 8A. In operation 970, the wearable apparatus 110 may determine left hip joint torque reference information T_l and right hip joint torque reference information T_r. For example, the wearable apparatus 110 may determine the left hip joint torque reference information T_l and the right hip joint torque reference information T_r respectively to be "0".

In response to the determination of the right hip joint torque reference information T_r and the left hip joint torque reference information T_l, the wearable apparatus 110 may determine right hip joint torque command information t_r and left hip joint torque command information t_l, in operation 980. The description of operation 510-13 of FIG. 5 may apply to operation 950 of FIG. 9, and thus duplicate description will be omitted for conciseness.

As described above, the wearable apparatus 110 may also recognize the exercise moves of the squat exercise through the FSM-based manner, which will be described further with reference to FIG. 10.

Figure 10:
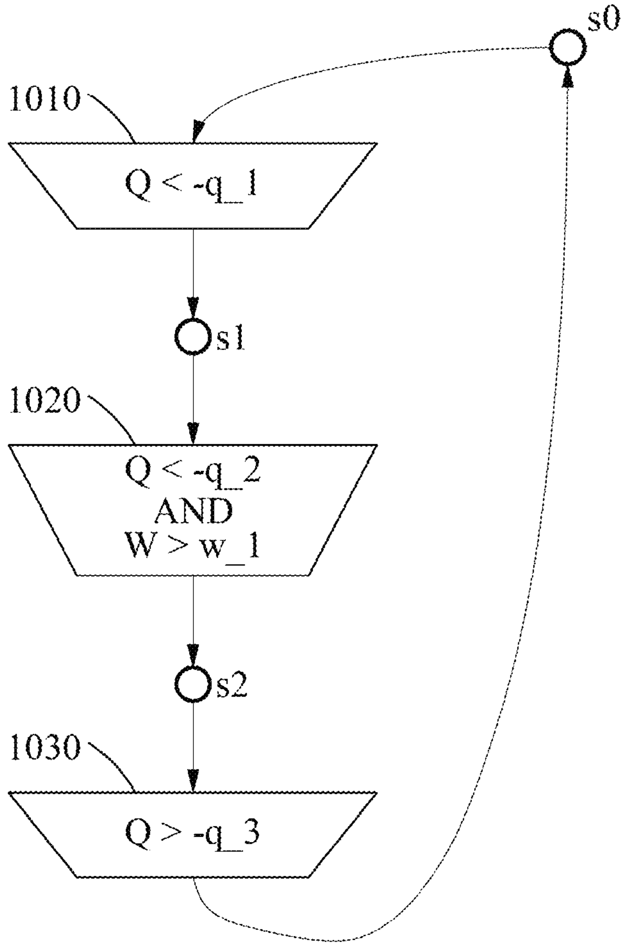

Referring to FIG. 10, a plurality of states s0 through s2 and a plurality of transition gates 1010 through 1030 are shown.

The states s0 through s2 of FIG. 10 may correspond to the exercise moves of FIGS. 8A through 8C, respectively.

Figure 11:
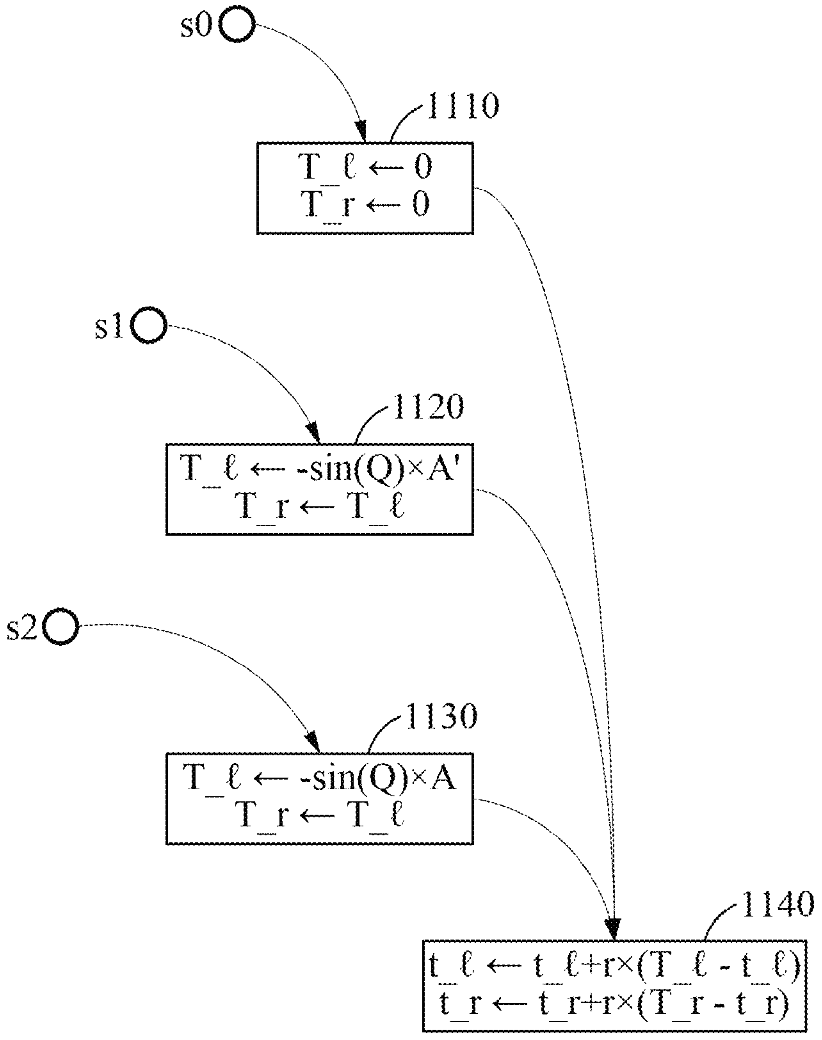

In the state s0, the wearable apparatus 110 may determine both hip joint torque reference information and determine both hip joint torque command information based on the both hip joint torque reference information. Referring to FIG. 11, in operation 1110, the wearable apparatus 110 may determine left hip joint torque reference information T_l and right hip joint torque reference information T_r in the state s0. In operation 1140, the wearable apparatus 110 may determine left hip joint torque command information t_l by smoothing the left hip joint torque reference information T_l and determine right hip joint torque command information t_r by smoothing the right hip joint torque reference information T_r.

In the state s0, the wearable apparatus 110 may determine whether an average Q of both hip joint angles is less than −q_1. In response to the average Q of the hip joint angles being less than −q_1, the wearable apparatus 110 may transition from the state s0 to the state s1.

In the state s1, the wearable apparatus 110 may determine both hip joint torque reference information and determine both hip joint torque command information based on the both hip joint torque reference information. Referring to FIG. 11, in operation 1120, the wearable apparatus 110 may determine left hip joint torque reference information T_l based on T_l=−sin(Q)×A' and determine right hip joint torque reference information T_r based on T_r=T_l in the state s1. In operation 1140, the wearable apparatus 110 may determine left hip joint torque command information t_l by smoothing the left hip joint torque reference information T_l and determine right hip joint torque command information t_r by smoothing the right hip joint torque reference information T_r.

In the state s1, the wearable apparatus 110 may determine whether an average Q of both hip joint angles is greater than −q_3. In response to the average Q of the hip joint angles being greater than −q_3, the wearable apparatus 110 may transition from the state s1 to the state s2.

In the state s2, the wearable apparatus 110 may determine both hip joint torque reference information and determine both hip joint torque command information based on the both hip joint torque reference information. Referring to FIG. 11, in operation 1130, the wearable apparatus 110 may determine left hip joint torque reference information T_l based on T_l=−sin(Q)×A and determine right hip joint torque reference information T_r based on T_r=T_l in the state s2. In operation 1140, the wearable apparatus 110 may determine left hip joint torque command information t_l by smoothing the left hip joint torque reference information T_l and determine right hip joint torque command information t_r by smoothing the right hip joint torque reference information T_r.

The wearable apparatus 110 may output a torque appropriate for each state or each exercise move. Accordingly, the wearable apparatus 110 may assist the squat exercise of the user 120 or apply an appropriate resistance to the squat exercise.

FIG. 12A through 15 illustrate a step-up exercise assistance of a wearable apparatus according to at least one example embodiment.

FIGS. 12A through 12G illustrate exercise moves of a step-up exercise.

Figure 12A:
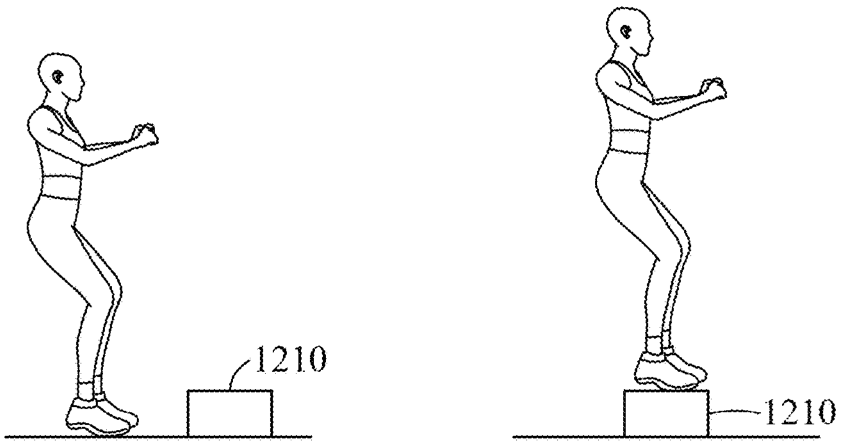

FIG. 12A shows an exercise move of the user 120 stepping on the ground and an exercise move of the user 120 stepping on an object 1210.

Figure 12B:
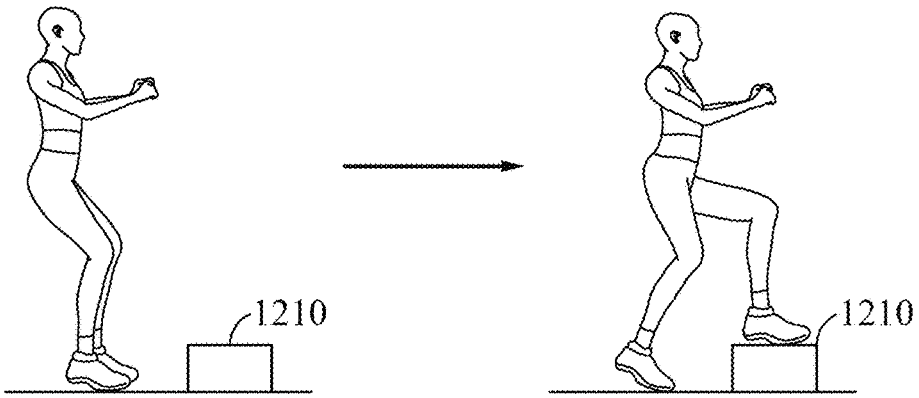

FIG. 12B shows an exercise move of the user 120 stepping up with a left leg while stepping on the ground with a right leg.

Figure 12C:
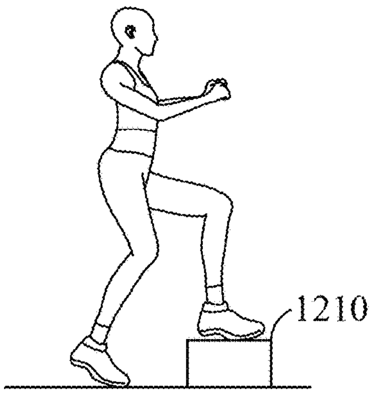

FIG. 12C shows an exercise move of the user 120 stepping on the ground with the right leg and stepping on the object 1210 with the left leg.

Figure 12D:
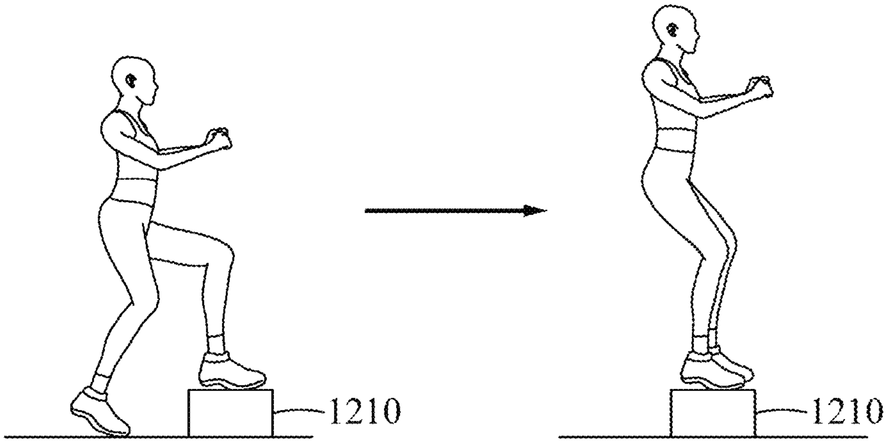

FIG. 12D shows an exercise move of the user 120 stepping up with the right leg while stepping on the object 1210 with the left leg.

Figure 12E:
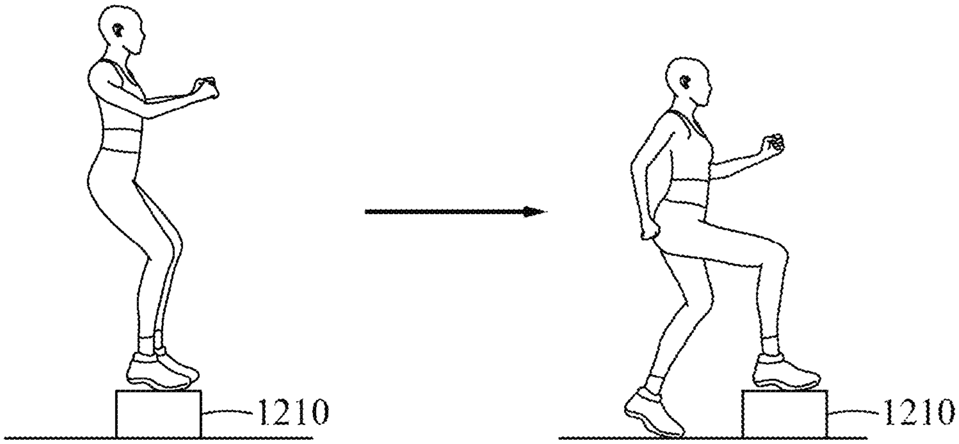

FIG. 12E shows an exercise move of the user 120 stepping down with the left leg while stepping on the object 1210 with the right leg.

Figure 12F:
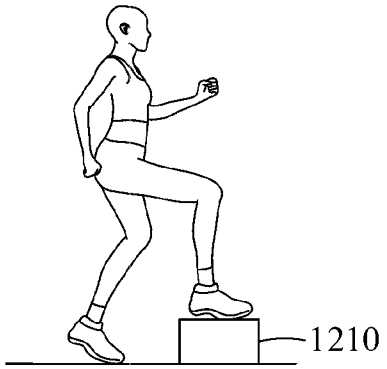

FIG. 12F shows an exercise move of the user 120 stepping on the ground with the left leg and stepping on the object 1210 with the right leg.

Figure 12G:
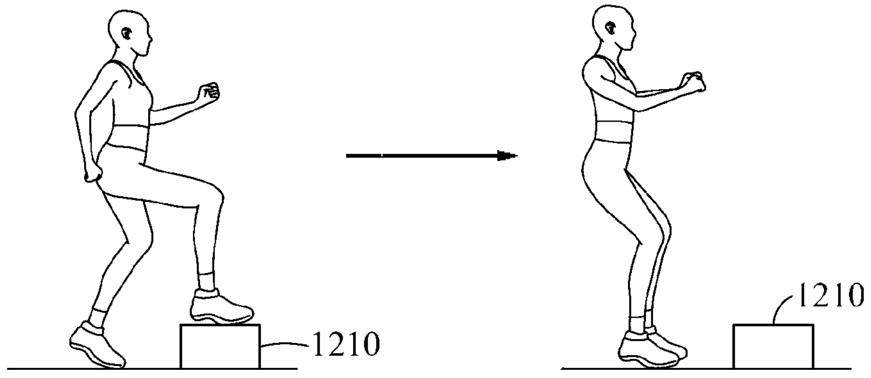

FIG. 12G shows an exercise move of the user 120 stepping down with the right leg while stepping on the ground with the left leg.

The wearable apparatus 110 may recognize the exercise moves during the step-up exercise assistance, which will be described further with reference to FIGS. 13 and 14.

Figure 13:
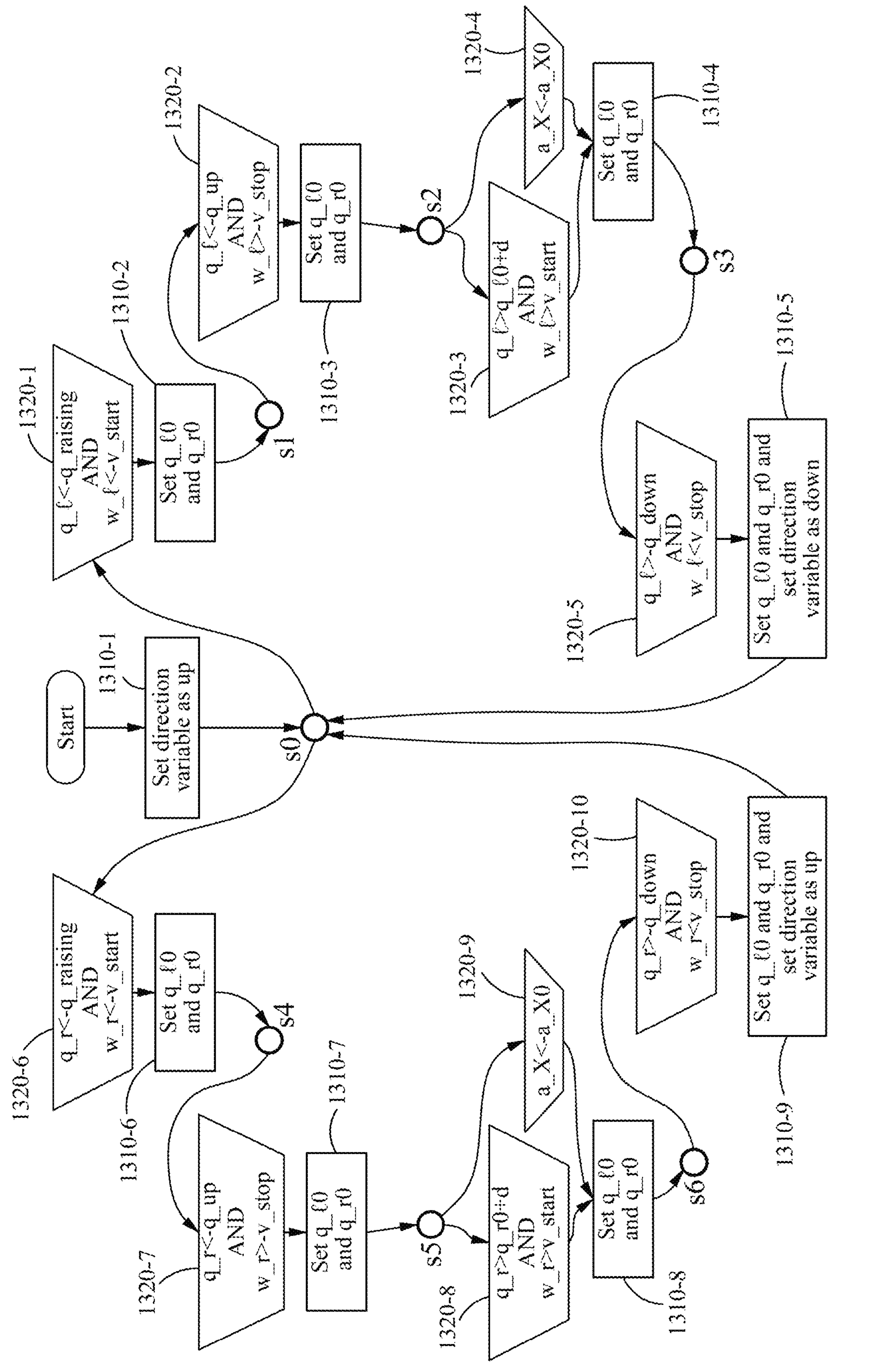

Referring to FIG. 13, a plurality of states s0 through s6 and a plurality of transition gates 1320-1 through 1320-10 are illustrated.

The states s0 through s6 of FIG. 13 may correspond to the exercise moves of FIGS. 12A through 12G, respectively.

The wearable apparatus 110 may be set in a step-up exercise mode by the user 120.

If the wearable apparatus 110 is set in a mode for a user to start a step-up exercise on the floor, a direction variable may be set as "up" (there are two direction variables "up" and "down"), in operation 1310-1. In other words, the wearable apparatus 110 may set the direction variable as "true". If the wearable apparatus 110 is set in a mode for the user to start the exercise on the object 1210, the direction variable may be set as "down", that is, "false".

The wearable apparatus 110 may set the direction variable as "up" and then, transition to the state s0.

In the state s0, the wearable apparatus 110 may determine whether a left hip joint angle q_l is less than −q_raising and whether an angular velocity w_l of the left hip joint angle is less than −v_start. q_raising may be, for example, 30 degrees, but is not limited thereto. v_start may be, for example, 0.1 rad/sec, but is not limited thereto.

In response to the left hip joint angle q_l being less than −q_raising and in response to the angular velocity w_l of the left hip joint angle being less than −v_start, the wearable apparatus 110 may set a left hip joint average angle q_l0 and a right hip joint average angle q_r0, in operation 1310-2. For example, the wearable apparatus 110 may set the left hip joint average angle q_l0 based on q_l0=q_l and set the right hip joint average angle q_r0 based on q_r0=q_r. Further, in response to the left hip joint angle q_l being less than −q_raising and in response to the angular velocity w_l of the left hip joint angle being less than −v_start, the wearable apparatus 110 may transition from the state s0 to the state s1.

In the state s1, the wearable apparatus 110 may determine whether the left hip joint angle q_l is less than −q_up and whether the angular velocity w_l of the left hip joint angle is greater than −v_stop. q_up may be, for example, 60 degrees, but is not limited thereto. v_stop may be, for example, 0.1 rad/sec, but is not limited thereto.

In response to the left hip joint angle q_l being less than −q_up and in response to the angular velocity w_l of the left hip joint angle being greater than −v_stop, the wearable apparatus 110 may set the left hip joint average angle q_l0 and the right hip joint average angle q_r0 in operation 1310-3, and transition from the state s1 to the state s2.

In the state s2, the wearable apparatus 110 may determine whether the left hip joint angle q_l is greater than −q_l0+d and the angular velocity w_l of the left hip joint angle is greater than v_start. d may be, for example, 5 degrees, but is not limited thereto. Further, the wearable apparatus 110 may determine whether an acceleration a_X measured with respect to an upper body of the user 120 is less than −a_X0. a_X0 may be, for example, 2 rad/sec$^r$, but is not limited thereto.

An inertial measurement unit (IMU) sensor of the wearable apparatus 110 may measure the acceleration with respect to the upper body of the user 120.

In response to the left hip joint angle q_l being greater than −q_l0+d and in response to the angular velocity w_l of the left hip joint angle being greater than v_start and in response to a_X being less than −a_X0, the wearable apparatus 110 may set the left hip joint average angle q land the right hip joint average angle q_r in operation 1310-4, and transition from the state s2 to the state s3. The description of operation 1310-2 may apply to operation 1310-4, and thus duplicate description will be omitted for conciseness.

In the state s3, the wearable apparatus 110 may determine whether the left hip joint angle q_l is greater than −q_down and whether the angular velocity w_l of the left hip joint angle is less than v_stop. q_down may be, for example, 10 degrees, but is not limited thereto.

In response to the left hip joint angle q_l being greater than −q_down and in response to the angular velocity w_l of the left hip joint angle being less than v_stop, the wearable apparatus 110 may set the left hip joint average angle q_l and the right hip joint average angle q_r and set the direction variable as "down" in operation 1310-5, and transition from the state s3 to the state s0. The description of operation 1310-2 may apply to the setting of the left hip joint average angle q_l and the right hip joint average angle q_r in operation 1310-5, and thus duplicate description will be omitted for conciseness.

In the state s0, the wearable apparatus 110 may determine whether a right hip joint angle q_r is less than −q_raising and an angular velocity w_r of the right hip joint angle is less than −v_start.

In response to the right hip joint angle q_r being less than −q_raising and in response to the angular velocity w_r of the right hip joint angle being less than −v_start, the wearable apparatus 110 may set a left hip joint average angle and a right hip joint average angle in operation 1310-6, and transition from the state s0 to the state s4. The description of operation 1310-2 may apply to operation 1310-6, and thus duplicate description will be omitted for conciseness.

In the state s4, the wearable apparatus 110 may determine whether the right hip joint angle q_r is less than −q_up and whether the angular velocity w_r of the right hip joint angle is greater than −v_stop.

In response to the right hip joint angle q_r being less than −q_up and in response to the angular velocity w_r of the right hip joint angle being greater than −v_stop, the wearable apparatus 110 may set the left hip joint average angle and the right hip joint average angle in operation 1310-7, and transition from the state s4 to the state s5. The description of operation 1310-2 may apply to operation 1310-7, and thus duplicate description will be omitted for conciseness.

In the state s5, the wearable apparatus 110 may determine whether the right hip joint angle q_r is greater than q_r0+d and whether the angular velocity w_r of the right hip joint angle is greater than v_start. Further, the wearable apparatus 110 may determine whether an acceleration a_X measured with respect to the upper body of the user 120 is less than −a_X0.

In response to the right hip joint angle q_r being greater than q_r0+d and in response to the angular velocity w_r of the right hip joint angle being greater than v_start and in response to a_X being less than −a_X0, the wearable apparatus 110 may set the left hip joint average angle and the right hip joint average angle in operation 1310-8, and transition from the state s5 to the state s6. The description of operation 1310-2 may apply to operation 1310-8, and thus duplicate description will be omitted for conciseness.

In the state s6, the wearable apparatus 110 may determine whether the right hip joint angle q_r is greater than −q_down and whether the angular velocity w_r of the right hip joint angle is less than v_stop.

In response to the right hip joint angle q_r being greater than −q_down and in response to the angular velocity w_r of the right hip joint angle being less than v_stop, the wearable apparatus 110 may set the left hip joint average angle and the right hip joint average angle and set the direction variable as "up" in operation 1310-9, and transition from the state s6 to the state s0. The description of operation 1310-2 may apply to the setting of the left hip joint average angle and the right hip joint average angle in operation 1310-9, and thus duplicate description will be omitted for conciseness.

The wearable apparatus 110 may determine torque reference information and torque command information in each state of the step-up exercise, which will be described further with reference to FIG. 14.

Figure 14:
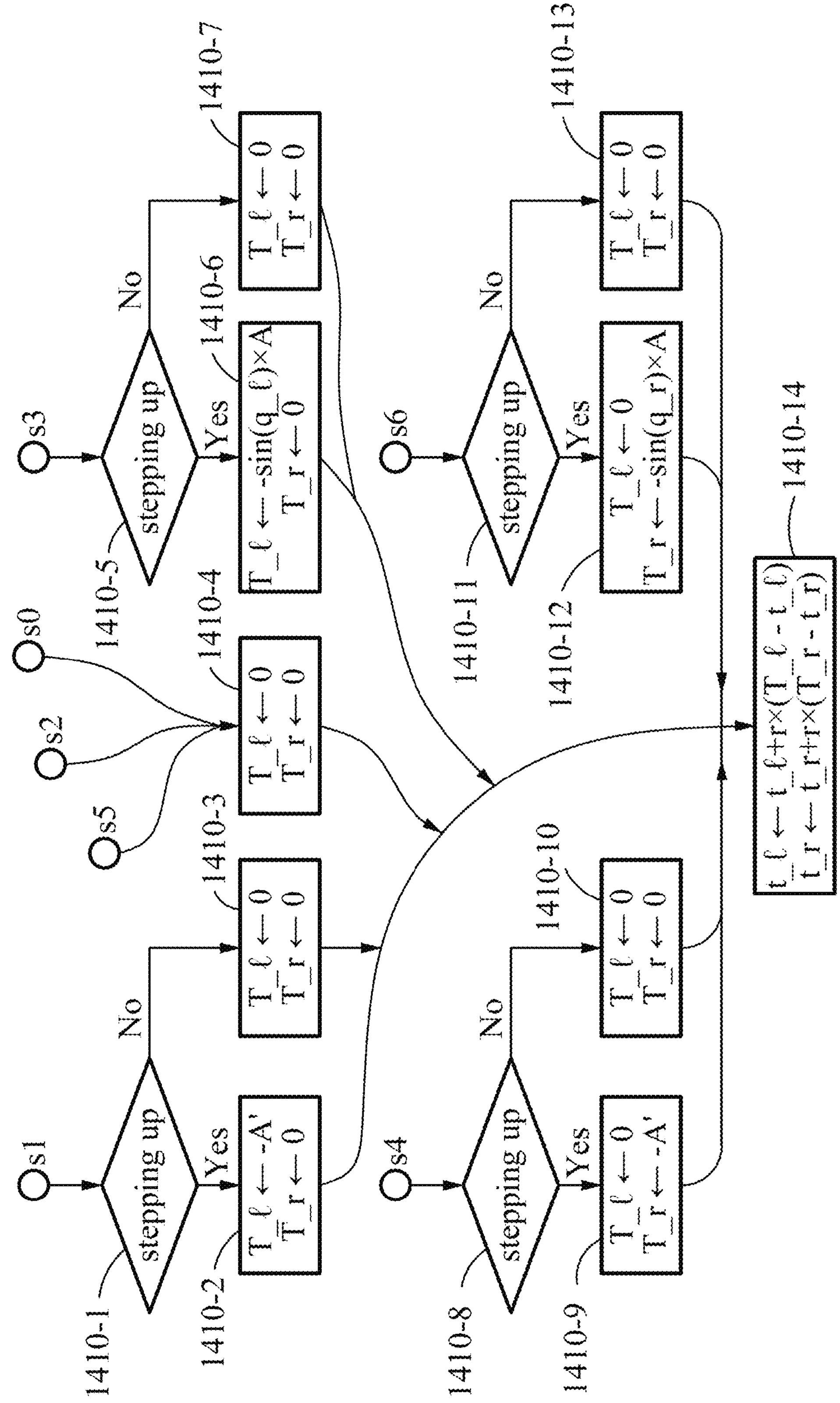

Referring to FIG. 14, in the states s0, s2, and s5, the wearable apparatus 110 may determine both hip joint torque reference information. As shown in FIG. 14, in the states s0, s2, and s5, the wearable apparatus 110 may determine both hip joint torque reference information respectively to be "0" in operation 1410-4, and determine both hip joint torque command information based on the both hip joint torque reference information in operation 1410-14.

In the state s1, the wearable apparatus 110 may determine whether a direction variable is "true" in operation 1410-1. For example, the wearable apparatus 110 may determine that the user 120 is performing the exercise move of FIG. 12B, determine left hip joint torque command information T_l to be −A' and determine right hip joint torque reference information T_r to be "0" in operation 1410-2, as shown in FIG. 14. In the state s1, in response to the determination of the direction variable to be "false", the wearable apparatus 110 may determine the both hip joint torque reference information to be "0", as shown in FIG. 14. For example, if the direction variable is "false" in the state s1, the wearable apparatus 110 may determine the both hip joint torque reference information to be "0". In detail, the direction variable being "false" may indicate that the user 120 is stepping down with the right leg from the object 1210 to the ground. If the direction variable is "false", the wearable apparatus 110 may determine that an exercise assistance is not needed since the user 120 is stepping down with the right leg from the object 1210 to the ground, and determine the both hip joint torque reference information to be "0" based on a result of the determining.

In the state s3, the wearable apparatus 110 may determine whether the direction variable is "true", in operation 1410-5. For example, the wearable apparatus 110 may recognize that the user is performing the exercise move of FIG. 12D, and determine left hip joint torque command information T_l based on T_l=−sin(q_l)×A and determine right hip joint torque reference information T_r to be "0" in operation 1410-6, as shown in FIG. 14. The wearable apparatus 110 may determine both hip joint torque command information in operation 1410-14 and output a torque based on the determined both hip joint torque command information, thereby assisting the exercise move of FIG. 12D. In the state s3, in response to the determination of the direction variable to be "false", the wearable apparatus 110 may determine the both hip joint torque reference information to be "0" in operation 1410-7, as shown in FIG. 14.

In the state s4, the wearable apparatus 110 may determine whether the direction variable is "true", in operation 1410-8. For example, the wearable apparatus 110 may recognize that the user 120 is performing the exercise move of FIG. 12E, and determine left hip joint torque command information T_l to be "0" and determine right hip joint torque reference information T_r to be −A' in operation 1410-9, as shown in FIG. 14. The wearable apparatus 110 may determine both hip joint torque command information in operation 1410-14 and output a torque based on the determined both hip joint torque command information, thereby assisting the exercise move of FIG. 12E. In the state s4, in response to the determination of the direction variable to be "false", the wearable apparatus 110 may determine the both hip joint torque reference information to be "0" in operation 1410-10, as shown in FIG. 14.

In the state s6, the wearable apparatus 110 may determine whether the direction variable is "true", in operation 1410-11. For example, the wearable apparatus 110 may recognize that the user 120 is performing the exercise move of FIG. 12G, and determine left hip joint torque command information T_l to be "0" and determine right hip joint torque reference information T_r based on T_r=−sin(q_r)×A in operation 1410-12, as shown in FIG. 14. The wearable apparatus 110 may determine both hip joint torque command information in operation 1410-14 and output a torque based on the determined both hip joint torque command information, thereby assisting the exercise move of FIG. 12G. In the state s6, in response to the determination of the direction variable to be "false", the wearable apparatus 110 may determine the both hip joint torque reference information to be "0" in operation 1410-13, as shown in FIG. 14.

The wearable apparatus 110 may determine both hip joint torque command information in each state. That is, the wearable apparatus 110 may perform operation 1410-14 in each state. In addition, the wearable apparatus 110 may update the left hip joint average angle q_l0 and the right hip joint average angle q_r0 described above, in each state. For example, the wearable apparatus 110 may update the left hip joint average angle q_l0 and the right hip joint average angle q_r0 based on Equation 6.

$$q\_l0 \leftarrow q\_l0 + a \times (q\_l - q\_l0)$$

$$q\_r0 \leftarrow q\_r0 + a \times (q\_r - q\_r0) \qquad \text{[Equation 6]}$$

In Equation 6, a denotes an update rate. a may be a value between "0" and "1". Referring to Equation 6, q_l0 may be updated to follow a new input q_l, and q_r0 may be updated to follow q_r. In this example, as a gets closer to "0", q_l0 may be updated to slowly follow q_l, and q_r0 may be updated to slowly follow q_r. As a gets closer to "1", q_l0 may be updated to quickly follow q_l, and q_r0 may be updated to quickly follow q_r.

Equation 6 may be expressed differently, as shown in Equation 7 or Equation 8.

$$q\_l0 = q\_l0\_prv + a \times (q\_l - q\_l0\_prv)$$

$$q\_r0 = q\_r0\_prv + a \times (q\_r - q\_r0\_prv) \qquad \text{[Equation 7]}$$

$$q\_l0(i) = q\_l0(i-1) + a \times (q\_l(i) - q\_l0(i-1))$$

$$q\_r0(i) = q\_r0 + a \times (q\_r(i) - q\_r(i-1)) \qquad \text{[Equation 8]}$$

In Equation 7, q_l0_prv denotes a previous left hip joint average angle, and q_r0_prv denotes a previous right hip joint average angle. In Equation 8, i denotes an index of a sampling time.

The wearable apparatus 110 may output a torque appropriate for each state or each exercise move. Accordingly, the wearable apparatus 110 may assist the step-up exercise of the user 120 or apply an appropriate resistance to the step-up exercise.

FIG. 15 illustrates several cases and state transitions of a step-up exercise.

A step-up exercise may include several cases depending on with which leg the user 120 steps on and down first.

As shown in FIG. 15, the user 120 may step up with a left leg, step up with a right leg, step down with the left leg, and step down with the right leg. In this example, the state may transition in an order of s0, s1, s2, s3, s0, s4, s5, s6, and s0.

The user 120 may step up with the left leg, step up with the right leg, step down with the right leg, and step down with the left leg. In this example, the state may transition in an order of s0, s1, s2, s3, s0, s1, s2, s3, and s0.

The user 120 may step up with the right leg, step up with the left leg, step down with the left leg, and step down with the right leg. In this example, the state may transition in an order of s0, s4, s5, s6, s0, s4, s5, s6, and s0.

The user 120 may step up with the right leg, step up with the left leg, step down with the left leg, and step down with the right leg. In this example, the state may transition in an order of s0, s4, s5, s6, s0, s1, s2, s3, and s0.

Figure 16:
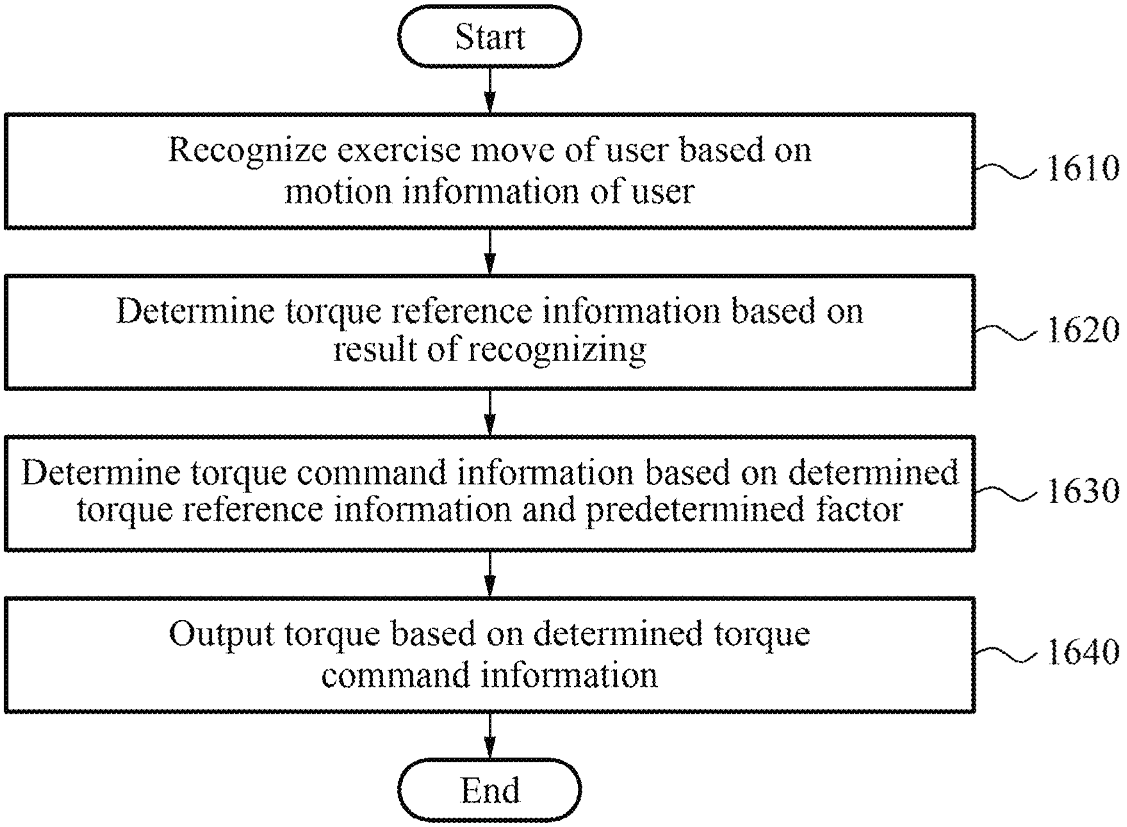
FIG. 16 illustrates an operating method of a wearable apparatus according to at least one example embodiment.

FIG. 16 illustrates an operating method of a wearable apparatus according to at least one example embodiment.

Referring to FIG. 16, in operation 1610, the wearable apparatus 110 may recognize an exercise move of the user 120 based on motion information of the user 120 generated using, for example, encoders and/or an inertial measurement unit.

The wearable apparatus 110 may recognize an exercise move of an exercise performed by the user 120 based on at least one of angular velocities of both hip joint angles of the user 120 and at least one of the hip joint angles. Examples of the wearable apparatus 110 recognizing exercise moves of a lunge exercise, a squat exercise, or a step-up exercise of the user 120 will be described.

Prior to recognizing the exercise move, the wearable apparatus 110 may receive an input from the user of an exercise mode from among a plurality of exercise modes (e.g., lunge exercise mode, squat exercise mode, or step-up exercise mode).

<Exercise Move Recognition of Wearable Apparatus when User Performs Lunge Exercise>

In response to a difference between both hip joint angles of the user 120 being greater than a first threshold angle (for example, q_l described above), the wearable apparatus 110 may recognize an exercise move of the user 120 with one leg (for example, the right leg) positioned forward (for example, the exercise move of FIG. 4E). In response to the difference between the hip joint angles of the user 120 being less than a second threshold angle (for example, −q_1), the wearable apparatus 110 may recognize an exercise move of the user 120 with the other leg (for example, the left leg) positioned forward (for example, the exercise move of FIG. 4B). In this example, the wearable apparatus 110 may recognize an exercise move of the user 120 straightening a bent knee and raising an upper body or an exercise move of the user 120 bending a knee and lowering the upper body, through a result of comparing a difference between angular velocities of the hip joint angles of the user 120 to a desired (or, alternatively, a predetermined) value (for example, "0"). For example, in response to the difference between the angular velocities of the hip joint angles of the user 120 being less than "0", the wearable apparatus 110 may recognize the going-up exercise move of the lunge exercise described with reference to FIG. 4D or FIG. 4G. In response to the difference between the angular velocities of the hip joint angles of the user 120 being greater than "0", the wearable apparatus 110 may recognize the going-down exercise move of the lunge exercise described with reference to FIG. 4C or FIG. 4F.

Depending on implementation, in response to the difference between the hip joint angles of the user 120 being greater than a third threshold angle (for example, −q_2 described above) and in response to one of the angular velocities of the hip joint angles being greater than a first threshold angular velocity (for example, w_1 described above), the wearable apparatus 110 may recognize an exercise move of the user 120 straightening the bent knee and raising the upper body (for example, the exercise move of FIG. 4D).

<Exercise Move Recognition of Wearable Apparatus when User Performs Squat Exercise>

The wearable apparatus 110 may recognize an exercise move of the user 120 bending knees and lowering an upper body (for example, the sitting-down exercise move of the squat exercise of FIG. 8B) through a result of comparing an average of the hip joint angles of the user 120 to a fourth threshold angle (for example, −q_l described above).

The wearable apparatus 110 may recognize an exercise move of the user 120 straightening the bent knees and raising the upper body (for example, the going-up exercise move of the squat exercise of FIG. 8C) through various manners. In an example, the wearable apparatus 110 may recognize the exercise move of the user 120 straightening the bent knees and raising the upper body through a result of comparing an average of angular velocities of both hip joint angles of the user 120 to a desired (or, alternatively, a predetermined) value (for example, "0"). In another example, in response to the average of the hip joint angles of the user 120 being less than a fifth threshold angle (for example, −q_2 described above) and in response to the average of the angular velocities of the hip joint angles being greater than a second threshold angular velocity (for example, w_1 described above), the wearable apparatus 110 may recognize the exercise move of the user 120 straightening the bent knees and raising the upper body.

<Exercise Move Recognition of Wearable Apparatus when User Performs Step-Up Exercise>

In response to one hip joint angle of the user 120 being less than a sixth threshold angle (for example, −q_raising described above) and in response to an angular velocity of the one hip joint angle being less than a third threshold angular velocity (for example, −v_start described above), the wearable apparatus 110 may recognize an exercise move of the user 120 stepping up with one leg (for example, the exercise move of stepping up with the left leg in the step-up exercise of FIG. 12B).

In response to the recognition of the exercise move of the user 120 stepping up with the one leg, the wearable apparatus 110 may sense whether the one hip joint angle of the user 120 is less than a seventh threshold angle (for example, −q_up described above) and whether the angular velocity of the one hip joint angle is greater than a fourth threshold angular velocity (for example, −v_stop described above). Based on a result of the sensing, the wearable apparatus 110 may recognize an exercise move of the user 120 stepping on an object with one leg (for example, the exercise move of stepping on the object with the left leg in the step-up exercise of FIG. 12C).

In response to the recognition of the exercise move of the user 120 stepping on the object with the one leg, the wearable apparatus 110 may sense whether the one hip joint angle of the user 120 is greater than an eighth threshold angle (for example, q_l0+d described above), whether the angular velocity of the one hip joint angle is greater than a fifth threshold angular velocity (for example, v_start described above), and whether an acceleration measured with respect to the body of the user 120 is less than a threshold acceleration (for example, a_X0 described above). Based on a result of the sensing, the wearable apparatus 110 may recognize an exercise move of the user 120 stepping up with the other leg while stepping on the object with the one leg (for example, the exercise move of stepping up with the right leg in the step-up exercise of FIG. 12D).

In response to the recognition of the exercise move of the user 120 stepping up with the other leg while stepping on the object with the one leg, the wearable apparatus 110 may sense whether the one hip joint angle of the user 120 is greater than a ninth threshold angle (for example, −q_down described above) and whether the angular velocity of the one hip joint angle is less than a sixth threshold angular velocity (for example, v_stop described above). Based on a result of the sensing, the wearable apparatus 110 may recognize an exercise move of the user 120 stepping on an object with both legs (for example, the exercise move of the user 120 stepping on the object, among the exercise moves of the step-up exercise of FIG. 12A).

In response to the recognition of the exercise move of the user 120 stepping on the object with both legs, the wearable apparatus 110 may sense whether the one hip joint angle of the user 120 is less than a tenth threshold angle (for example, −q_raising described above) and whether the angular velocity of the one hip joint angle is less than a seventh threshold angular velocity (for example, −v_start described above). Based on a result of the sensing, the wearable apparatus 110 may recognize an exercise move of the user 120 stepping down with one leg from the object (for example, the exercise move of stepping down with the left leg in the step-up exercise of FIG. 12E).

In response to the recognizing the exercise move of the user 120 stepping down with one leg from the object while stepping on the object with the other leg, the wearable apparatus 110 may sense whether the one hip joint angle of the user 120 is less than an eleventh threshold angle (for example, −q_up described above) and whether the angular velocity of the one hip joint angle is greater than an eighth threshold angular velocity (for example, −v_stop described above). Based on a result of the sensing, the wearable apparatus 110 may recognize an exercise move of the user 120 stepping on the ground with one leg and stepping on the object with the other leg (for example, the exercise move of stepping on the ground with the left leg and stepping on the object with the right leg in the step-up exercise of FIG. 12F).

In response to the recognition of the exercise move of the user 120 stepping on the ground with one leg and stepping on the object with the other leg, the wearable apparatus 110 may sense whether the one hip joint angle of the user 120 is greater than a twelfth threshold angle (for example, q_r0+d described above), whether the angular velocity of the one hip joint angle is greater than a ninth threshold angular velocity (for example, v_start described above), and whether the acceleration measured with respect to the body of the user 120 is less than a threshold acceleration (for example, a_X0 described above). Based on a result of the sensing, the wearable apparatus 110 may recognize an exercise move of the user 120 stepping down with the other leg (for example, the exercise move of stepping down with the right leg in the step-up exercise of FIG. 12G).

In response to the recognition of the exercise move of the user 120 stepping down with the other leg from the object while stepping on the ground with one leg, the wearable apparatus 110 may sense whether the one hip joint angle of the user 120 is greater than a thirteenth threshold angle (for example, −q_down described above) and whether the angular velocity of the one hip joint angle is less than a tenth threshold angular velocity (for example, v_stop described above). Based on a result of the sensing, the wearable apparatus 110 may recognize an exercise move of the user 120 stepping on the ground with both legs.

In operation 1620, the wearable apparatus 110 may determine torque reference information based on a result of recognizing the exercise move. For example, the wearable apparatus 110 may determine the torque reference information based on a torque gain (for example, A or A' described above) and at least one of a constant and a difference between both hip joint angles of the user 120.

In operation 1630, the wearable apparatus 110 may determine torque command information based on the determined torque reference information and a set (or, alternatively, a predetermined) factor. For example, the wearable apparatus 110 may determine the torque command information by smoothing the determined torque reference information based on the desired (or, alternatively, the predetermined) factor (for example, r described above).

In operation 1640, the wearable apparatus 110 may output a torque based on the determined torque command information.

The wearable apparatus 110 may recognize an exercise move of an exercise performed by the user and output an assistance torque (or a resistance torque) appropriate for the recognized exercise move, thereby assisting the exercise performed by the user (or providing a resistance to the exercise).

The description provided with reference to FIGS. 1 through 15 may apply to the description of FIG. 16, and thus duplicate description will be omitted for conciseness.

Figure 17:
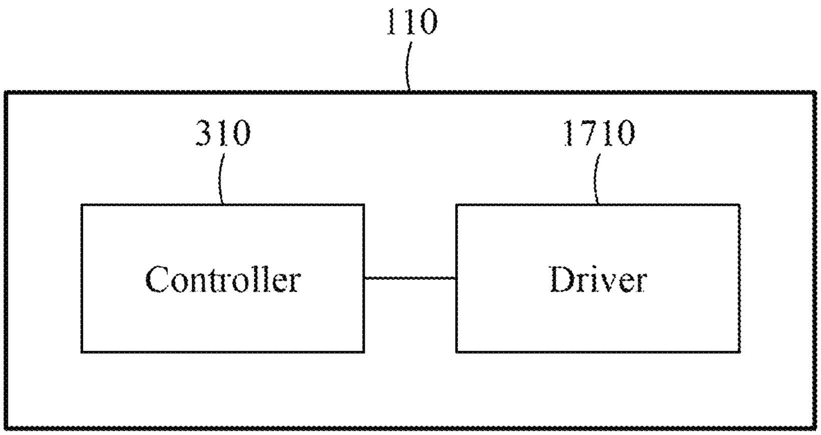
FIG. 17 illustrates a wearable apparatus according to at least one example embodiment.

FIG. 17 illustrates a wearable apparatus according to at least one example embodiment.

Referring to FIG. 17, the wearable apparatus 110 may include the controller 310 and a driver 1710. Further, the wearable apparatus 110 may include a user interface (UI) device and one or more sensors. The UI device may be configured to receive an input of an exercise mode (e.g., lunge exercise mode, squat exercise mode, or step-up exercise mode) from the user. The user interface (UI) device may include various appropriate devices, for example, a switch, a knob, and a jog dial, configured to set the exercise mode. The user interface (UI) device may be replaced with an external remote control or a smart device and may not need to be included in the wearable apparatus 110. The sensors may be angle sensors, for example, a potentiometer, an absolute encoder, or an incremental encoder, configured to measure an angle of a joint.

The controller 310 may be implemented in processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. The processing circuitry may be special purpose processing circuitry that performs the overall operation of the wearable apparatus 110 described with reference to FIGS. 1 through 16. For example, the controller 310 may receive an input from the user 120 indicating an exercise mode (e.g., lunge exercise mode, squat exercise mode, or step-up exercise mode), may recognize, within the exercise mode, an exercise move of the user 120 based on motion information of the user 120, determine torque reference information based on a result of the recognizing, determine torque command information based on the determined torque reference information and a set (or, alternatively, a predetermined) factor, and control the driver 1710 based on the determined torque command information. Thus, the processing circuitry may improve the functioning of the wearable apparatus 110 itself by properly assisting exercises of the user.

The driver 1710 may output a torque based on the control of the controller 310.

As shown in FIG. 17, the wearable apparatus 110 may include a single driver 1710. In another example, as described with reference to FIGS. 2 and 3, the wearable apparatus 110 may include the plurality of drivers 210-1 through 210-2.

The description provided with reference to FIGS. 1 through 16 may apply to the description of FIG. 17, and thus duplicate description will be omitted for conciseness.

The method according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An operating method of a wearable apparatus, the operating method comprising:

determining a first motion of a user as a first exercise move of a of a plurality of exercise moves which are distinguished from one another in a cycle of an exercise based on at least one of hip joint angles of the user;

outputting a first torque that assists the user as the user performs the first exercise move, the first torque being based on a first gain having a first sign; and outputting a second torque that resists the user as the user performs a second exercise move of the plurality of exercise moves when determining a second motion which is a subsequent motion of the first motion as the second exercise move, the second torque being based on a second gain having a second sign different from the first sign.

2. The operating method of claim 1, wherein the determining of the first motion comprises:

determining the first motion of the user as stepping forward with a first leg in response to a difference between the hip joint angles of the user being greater than a first threshold angle; and determining the first motion of the user stepping forward with a second leg in response to the difference between the hip joint angles of the user being less than a second threshold angle.

3. The operating method of claim 1, wherein the determining of the first motion comprises:

determining the first motion of the user as either (i) straightening a bent knee and raising an upper body or as (ii)_bending a knee and lowering the upper body through a result of comparing a difference between angular velocities of the hip joint angles of the user to a set value.

4. The operating method of claim 1, wherein the determining of the first motion comprises:

determining the first motion of the user as straightening a bent knee and raising an upper body, in response to a difference between the hip joint angles of the user being greater than a third threshold angle and one of the angular velocities of the hip joint angles being greater than a first threshold angular velocity.

5. The operating method of claim 1, wherein the determining of the first motion comprises:

determining the first motion of the user as bending knees and lowering an upper body through a result of comparing an average of the hip joint angles of the user to a fourth threshold angle.

6. The operating method of claim 1, wherein the determining of the first motion comprises:

determining the first motion of the user as straightening bent knees and raising an upper body through a result of comparing an average of angular velocities of the hip joint angles of the user to a set value.

7. The operating method of claim 1, wherein the determining of the first motion comprises:

determining the first motion of the user as straightening bent knees and raising an upper body in response to an average of the hip joint angles of the user being less than a fifth threshold angle and an average of angular velocities of the hip joint angles being greater than a second threshold angular velocity.

8. The operating method of claim 1, wherein the determining of the first motion comprises:

determining the first motion of the user as stepping up with one leg in response to one of the hip joint angles of the user being less than a sixth threshold angle and an angular velocity of the one of the hip joint angles being less than a third threshold angular velocity.

9. The operating method of claim 1, wherein the determining of the first motion comprises:

sensing whether one of the hip joint angles of the user is less than a seventh threshold angle and whether one of angular velocities of the hip joint angles is greater than a fourth threshold angular velocity, in response to determining a motion of the user as stepping up with one leg; and determining the first motion of the user as stepping on an object with the one leg based on a result of the sensing.

10. The operating method of claim 1, wherein the determining of the first motion comprises:

sensing whether one of the hip joint angles of the user is greater than an eighth threshold angle, whether one of angular velocities of the hip joint angles is greater than a fifth threshold angular velocity, and whether an acceleration measured with respect to a body of the user is less than a threshold acceleration, in response to determining a motion of the user as stepping on an object with a first leg; and determining the first motion of the user as stepping up with a second leg while stepping on the object with the first leg based on a result of the sensing.

11. The operating method of claim 1, wherein the determining of the first motion comprises:

sensing whether one of the hip joint angles of the user is greater than a ninth threshold angle and whether one of angular velocities of the hip joint angles is less than a sixth threshold angular velocity, in response to determining a motion of the user as stepping up with a first leg while stepping on an object with a second leg; and determining the first motion of the user as stepping on the object with both of the first leg and the second leg based on a result of the sensing.

12. The operating method of claim 1, wherein the determining of the first motion comprises:

sensing whether one of the hip joint angles of the user is less than a tenth threshold angle and whether one of angular velocities of the hip joint angles is less than a seventh threshold angular velocity, in response to determining a motion of the user as stepping on an object with both a first leg and a second leg of the user; and determining the first motion of the user as stepping down with the first leg from the object based on a result of the sensing.

13. The operating method of claim 1, wherein the determining of the first motion comprises:

sensing whether one of the hip joint angles of the user is less than an eleventh threshold angle and whether one of angular velocities of the hip joint angles is greater than an eighth threshold angular velocity, in response to determining a motion of the user as stepping down with a first leg from an object while stepping on the object with a second leg; and determining the first motion of the user as stepping on a ground with the first leg and stepping on the object with the second leg based on a result of the sensing.

14. The operating method of claim 1, wherein the determining of the first motion comprises:

sensing whether one of the hip joint angles of the user is greater than a twelfth threshold angle, whether one of angular velocities of the hip joint angles is greater than a ninth threshold angular velocity, and whether an acceleration measured with respect to a body of the user is less than a threshold acceleration, in response to determining a motion of the user as stepping on a ground with a first leg and stepping on an object with a second leg; and determining the first motion of the user as stepping down with the second leg based on a result of the sensing.

15. The operating method of claim 1, wherein the determining of the first motion comprises:

sensing whether one of the hip joint angles of the user is greater than a thirteenth threshold angle and whether one of angular velocities of the hip joint angles is less than a tenth threshold angular velocity, in response to determining a motion of the user as stepping down with a first leg from an object while stepping on a ground with a second leg; and determining the first motion of the user as stepping on the ground with both the first leg and the second leg based on a result of the sensing.

16. The operating method of claim 1, further comprising:

determining torque reference information based on a torque gain and at least one of a constant and a difference between the hip joint angles of the user.

17. The operating method of claim 16, further comprising:

determining torque command information by smoothing the torque reference information based on a set factor.

18. A wearable apparatus, comprising:

a driver configured to output a torque; and a controller configured to, determine a first motion of a user as a first exercise move of a plurality of exercise moves which are distinguished from one another in a cycle of an exercise based on at least one of the hip joint angles of the user, control the driver to output a first torque that assists the user as the user performs the first exercise move, and control the driver to output a second torque that resists the user as the user performs a second exercise move of the plurality of exercise moves when determining a second motion which is a subsequent motion of the first motion as the second exercise move, wherein the first torque is based on a first gain having a first sign, and the second torque is based on a second gain having a second sign different from the first sign.

* * * * *